(12) United States Patent
Barber et al.

(10) Patent No.: US 9,712,497 B2
(45) Date of Patent: *Jul. 18, 2017

(54) METHOD AND SYSTEM FOR CREATION AND VERIFICATION OF ANONYMOUS DIGITAL CREDENTIALS

(71) Applicant: Kount Inc., Boise, ID (US)

(72) Inventors: Timothy P. Barber, Boise, ID (US); Lewis De Payne, Boise, ID (US)

(73) Assignee: Kount Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/863,581

(22) Filed: Sep. 24, 2015

(65) Prior Publication Data

US 2016/0014092 A1     Jan. 14, 2016

Related U.S. Application Data

(63) Continuation of application No. 13/619,609, filed on Sep. 14, 2012, now Pat. No. 9,191,370, which is a continuation of application No. 12/245,331, filed on Oct. 3, 2008, now Pat. No. 8,296,245.

(60) Provisional application No. 61/018,755, filed on Jan. 3, 2008.

(51) Int. Cl.
*H04L 29/06*     (2006.01)
*G06F 21/31*     (2013.01)
*G06Q 10/10*     (2012.01)
*H04L 29/08*     (2006.01)

(52) U.S. Cl.
CPC .......... *H04L 63/0407* (2013.01); *G06F 21/31* (2013.01); *G06Q 10/107* (2013.01); *H04L 65/403* (2013.01); *H04L 67/306* (2013.01)

(58) Field of Classification Search
CPC .............................. H04L 63/0407; G06F 21/31
See application file for complete search history.

(56) References Cited

U.S. PATENT DOCUMENTS

| | | | |
|---|---|---|---|
| 7,721,322 B2 * | 5/2010 | Sastry | H04L 63/105 709/206 |
| 9,465,505 B1 * | 10/2016 | Moody | G06F 3/048 |
| 2005/0233744 A1 * | 10/2005 | Karaoguz | H04W 12/08 455/432.3 |

(Continued)

OTHER PUBLICATIONS

Y. Zhang and Y. Fang, "A Fine-Grained Reputation System for Reliable Service Selection in Peer-to-Peer Networks," in IEEE Transactions on Parallel and Distributed Systems, vol. 18, No. 8, pp. 1134-1145, Aug. 2007.*

(Continued)

*Primary Examiner* — Kari Schmidt
(74) *Attorney, Agent, or Firm* — Fenwick & West LLP

(57) ABSTRACT

A method for providing an online reputation is disclosed. An online credential service assigns a unique client identifier to each user and a unique forum identifier to each forum that users participate. A user participating in one or more online forums registers for establishing a reputation profile at the online credential service. A unique verification code associated with each forum is generated for the user to include in the user's profile at the corresponding forum. A user's reputation is determined based on whether a verification code is included in the user's profile at the form.

18 Claims, 8 Drawing Sheets

(56) References Cited

U.S. PATENT DOCUMENTS

| | | | |
|---|---|---|---|
| 2005/0278540 A1* | 12/2005 | Cho | G06F 21/31 713/182 |
| 2008/0004949 A1* | 1/2008 | Flake | G06F 21/6245 705/14.69 |
| 2008/0028069 A1* | 1/2008 | Urbanek | G06Q 10/063 709/224 |
| 2008/0109491 A1* | 5/2008 | Gupta | G06Q 10/10 |
| 2010/0095277 A1* | 4/2010 | Cheng | G06F 8/71 717/127 |
| 2010/0306146 A1* | 12/2010 | Brown | G06N 99/005 706/45 |
| 2012/0296965 A1* | 11/2012 | Srivastava | G06Q 50/01 709/204 |
| 2013/0073473 A1* | 3/2013 | Heath | G06Q 30/02 705/319 |

OTHER PUBLICATIONS

Jackson, Collin, et al. "Protecting browser state from web privacy attacks." Proceedings of the 15th international conference on World Wide Web. ACM, 2006. (pp. 737-744).*

A. De Paola and A. Tamburo, "Reputation management in distributed systems," 2008 3rd International Symposium on Communications, Control and Signal Processing, St Julians, 2008, pp. 666-670.*

* cited by examiner

CredMe – Establish Your Reputation

CredMe Client Public Profile 610

611

Age: 39
Sex: Male
Geography: USA/Idaho

[?] [?] [?]
[?] [?] [?]

615

User/Forum-1 Profile 620

Forum: FORUM-1
User: bd808
Profile: http://Forum-1.com/users/bd808
Status: Verified for 15+ days

[Home] [My Profiles] [My Account] [Help] [Logout]
 651    652         653         654    655

Verified Profiles 630

631

| Forum | Status | Days Verified |
|---|---|---|
| CredMe.com | Valid | 20+ |
| Forum-1 | Valid | 15+ |
| Forum-2 | Valid | 15+ |
| Forum-3 | Invalid | 10+ |
| Forum-4 | Invalid | 5+ |
| Forum-5 | Invalid | 1+ |

632  633

Verified Credentials 640

641

| Forum | Credential | Value |
|---|---|---|
| CredMe | # of Forums | 5+ |
| Forum-5 | # of Sales | 50+ |
| Forum-5 | Rating | A |

CredMe.com Online Verification Service ~ 710

[jSmith] has a verified profile at: 720

FORUM-1.com — 725

*Connections:* 99
*Interests:* Swimming, hunting, fishing, reading, taking walks.
*Honors:* Father of the year, 2003.

Other verified profiles for this [jSmith]: 730

FORUM-2.com — 732

*Current Status:* User wonders why he is not in Alaska fishing.
*Friends:* 29
*Status:* In a relationship
*Hometown:* Bozeman
*Body Type:* 6'3"/Slim
*Religion:* Agnostic
*Zodiac Sign:* Pisces
*Education:* 12+

FORUM-3.com — 733

*Friends:* 200+

Online Encyclopedia FORUM-4.com — 734

*Edits:* 74

⋮

Video FORUM-N.com — 739

*Joined:* July 2006
*Last login:* 3 months ago
*Videos watched:* 394
*Country:* United States http://CredMe.com/verify/Forum-1.com/jSmith ~ 750

Advertising Space 790

Online Social Networking FORUM-1.com ~ 810

Discussion Topic

*How to build a gazebo in your backyard . . .*

820

Discussion Thread: ~ 830

~ 835

I have built a gazebos using a pretty good set of plans . . .

username: jSmith ~ 841

Here is verification of this user:
http://CredMe.com/verify/FORUM-1.com/jSmith/2094594 (optional) — 845

840

•
•
•

I have built plenty of gazebos in my time and have come up with a pretty good set of plans. It can be built in less than an hour. I have never had any complaints, and in fact . . .

USERNAME-N:

Fig. 8

METHOD AND SYSTEM FOR CREATION AND VERIFICATION OF ANONYMOUS DIGITAL CREDENTIALS

CROSS REFERENCE To RELATED APPLICATIONS

The present application is a continuation of U.S. application Ser. No. 13/619,609, filed Sep. 14, 2012, which is a continuation of U.S. application Ser. No. 12/245,331 filed Oct. 3, 2008, now U.S. Pat. No. 8,296,245, which claims priority to and the benefit of Provisional Application No. 61/018,755 to Barber et al., entitled "Method and System for Creation and Certification of Anonymous Digital Credentials," filed on Jan. 3, 2008, each of which is herein incorporated by reference in its entirety.

BACKGROUND OF THE INVENTION

Field of the Invention

The present invention is generally directed to the field of social networking through online communities or forums. Specifically, the present invention relates to providing management and verification of reputations for users and operators of online communities.

The Relevant Technology

The internet creates new ways to transfer information between users throughout the world. Ever evolving services as implemented through the internet provide for the communication of information for business, education, work, private, and social purposes. As a result, these services attract increasing numbers of users to the internet year after year.

Many thousands of web sites have communities of registered users who interact with each other via a forum accessible over the internet, e.g. via a social forum, via websites enabling auctions, via websites providing classifieds, and so on. For instance, online social networking sites or online forums provide an opportunity for multiple users to communicate with each other. Some forms of community communication include chatting forums, blogs discussing various topics, auction sites, trading sites providing a forum for exchanging goods and services, etc.

Participation in these online forums typically involves an exchange of information. One popular form is the textual exchange of information. For example, in a social chatting forum or blog, a user is allowed to post a message. The message may be situated anywhere in a string of messages associated with a particular discussion. For instance, the online forum may be an investment forum that provides discussion concentrating on the trading of stocks. Other users may respond by including their own message in the string of messages.

One inherent problem of these online forums is the monopolization and degradation of communication by certain users. One particular user may cloud participation in the online forum by focusing on what is unimportant or exhibiting bad behavior on the forum, such as constantly criticizing other users and their comments. As a result, the overall effectiveness and participation in the online forum will degrade over time.

An unsatisfactory solution is to kick the unwanted user out of the forum, once the manager of the online forum notices the bad behavior of the unwanted user. Unfortunately, this is only a short term solution, since the unwanted user can simply invent a new username having new registration information, and participate in the online forum using the new user name. The remaining users would not be aware that the same individual, who previously was kicked out, is participating under a new username. Over time, the discussion in the online forum would continue to be clouded by the deleterious participation of the individual, until that individual, posing under the new username is again kicked out of the online forum.

Another unsatisfactory solution would be to charge users of a social forum. However, asking for payment for access to such forums can be a serious impediment to attracting new users. Typically, registration for participation in any forums is performed without a fee to the user. Even if a forum requires an email address pursuant to registration, obtaining an e-mail address typically does not incur any cost. Asking for a fee upon registering with a forum would put that forum at a serious disadvantage to other cost-free forums. This free registration to forums enables the degradation of bad behavior. When an outlaw user is kicked out of a forum for bad behavior, that user can simply create a new email address and register again, using the new email address, without difficulty and without any financial cost.

SUMMARY OF THE INVENTION

A method and system for providing an online reputation of a client participating in one or more online forums. The method includes providing a unique client identifier associated with the client. In addition, a plurality of forum identifiers is provided for a plurality of online forums within which the client is participating, wherein each online forum is associated with a corresponding user profile. A plurality of unique verification codes is provided that is based on the plurality of forum identifiers and the client identifier. A plurality of verification sequences is provided for purposes of verifying a plurality of user profiles of the client associated with the plurality of online forums, wherein each of the plurality of verification sequences includes a corresponding verification code. Verification of a plurality of credentials associated with the plurality of user profiles is performed. A request is received that includes a corresponding verification sequence from a verifying entity for an online reputation of the client. The request is made in association with a first online forum within which the client is participating. A verified credential of a user profile that is associated with a second online forum is provided without revealing a user identity of the client that is associated with the second online forum.

In another embodiment, a system for providing an online reputation of a client is disclosed. The system includes a client manager that provides a unique client identifier that is associated with a client. In addition, a forum manager is included that provides a plurality of forum identifiers for a plurality of online forums within which the client is participating. Each online forum is associated with a corresponding user profile. A code generator is included that provides a plurality of verification codes, each of which is unique within the system. The plurality of verification codes is based on the plurality of forum identifiers and the client identifier. More particularly, each verification code is based on a corresponding forum identifier and the client identifier. A sequence generator is also included and provides a plurality of verification sequences for purposes of verifying the plurality of user profiles of the client in the plurality of online forums. Each of the verification sequences includes a corresponding verification code. In addition, a reputation manger is included that verifies a plurality of credentials associated with the plurality of user profiles. The reputation manager, upon request, provides an online reputation of the client including verified credentials of the plurality of user profiles without revealing user identities of the client that are associated with online forums other than an online forum that is associated with the request.

BRIEF DESCRIPTION OF THE DRAWINGS

Exemplary embodiments are illustrated in referenced figures of the drawings which illustrate what is regarded as the preferred embodiments presently contemplated. It is intended that the embodiments and figures disclosed herein are to be considered illustrative rather than limiting.

FIG. 6 is a diagram of an exemplary reputation profile of a corresponding client participating in one or more online forums, in accordance with one embodiment of the present invention.

FIG. 7 is a diagram illustration a reputation profile describing the online reputation of a client, in accordance with one embodiment of the present invention.

FIG. 8 is an illustration of an exemplary discussion thread in which a client is inviting other participants of the forum to view the online reputation of the client, in accordance with one embodiment of the present invention.

DETAILED DESCRIPTION OF THE PREFERRED EMBODIMENTS

Figure 1:
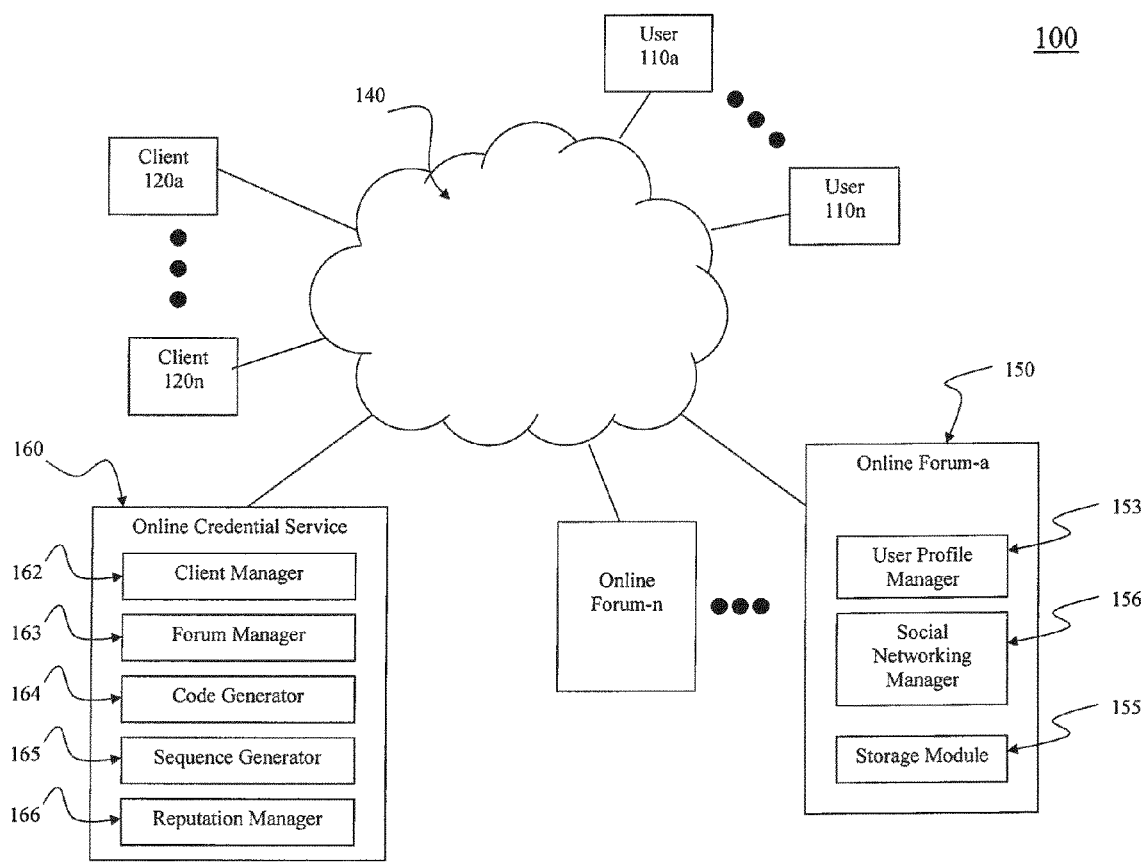
FIG. 1 is a diagram of a communication network capable of supporting one or more online forums, in accordance with one embodiment of the present invention.

Reference will now be made in detail to the preferred embodiments of the present invention, a method and system for establishing, maintaining, and presenting an online reputation of a client participating in one or more online forums and providing verification of the online reputation of the client. While the invention will be described in conjunction with the preferred embodiments, it will be understood that they are not intended to limit the invention to these embodiments. On the contrary, the invention is intended to cover alternatives, modifications and equivalents which may be included within the spirit and scope of the invention as defined by the appended claims.

Accordingly, embodiments of the present invention are capable of providing anonymous digital credentials of a client, for example, by a trusted third party. In this manner, an online reputation of the client is established and managed for purposes of verification of the client's online reputation. Anonymous digital credentials are practical, in that in some embodiments, they are merely a short string of text, and involve no public key cryptography. In other embodiments, anonymous digital credentials are secure in that they rely on some level of verifiability, but not secrecy, and are difficult to crack. In addition, anonymous digital credentials enhance privacy in that they are unique to each forum/client combination, and as such, there is no way to trace anonymous digital credentials to other forums frequented by a particular client. Still other embodiments of the present invention are capable of providing the above accomplishments and also for providing reputation management for users and operators of online communities. For instance, the anonymous digital credentials help prevent multiple registrations of a particular client in a particular online forum that is accessed via a website over the internet. Specifically, anonymous digital credentials enable a forum manager to easily detect a user with multiple usernames that are leveraging the same online reputation, and to permanently prevent a particular individual posing under different usernames, but a single online reputation, from coming back to the forum. Also, anonymous digital credentials give confidence to other forum users, since by verifying the credentials of a client who is participating in a particular forum other users can expect that the client is a person who will behave responsibly, lest the client detrimentally affect his or her online reputation.

Notation and Nomenclature

Embodiments of the present invention can be implemented on a software program for processing data through a computer system. The computer system can be a personal computer, notebook computer, server computer, mainframe, networked computer (e.g., router), handheld computer, personal digital assistant, workstation, and the like. This program or its corresponding hardware implementation is operable for providing verification of online reputations of a client who is participating in one or more online forums. In one embodiment, the computer system includes a processor coupled to a bus and memory storage coupled to the bus. The memory storage can be volatile or non-volatile and can include removable storage media. The computer can also include a display, provision for data input and output, etc.

Some portion of the detailed descriptions that follow are presented in terms of procedures, steps, logic block, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc. is here, and generally, conceived to be a self-consistent sequence of operations or instructions leading to a desired result. The operations are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," "creating," "providing," or the like refer to the actions and processes of a computer system, or similar electronic computing device, including an embedded system, that manipulates and transfers data represented as physical (electronic) quantities within the computer system's registers and memories into other data similarly represented as physical quantities within the computer system memories or registers or other such information storage, transmission or display devices.

Communication Network

Embodiments of the present invention are described within the context of a web-based system for providing verified credentials reflective of the online reputation of a client who is participating in one or more online forums. More particularly, the web-based system is capable of creating an online reputation of client through the authorization of the client. In addition, the web-based system is capable of automatically managing the online reputation of the client. For instance, the web-based system establishes, manages, and presents a reputation profile describing the online reputation of the client. As such, the web-based system is also capable of providing access to the reputation profile of the client to other users.

FIG. 1 is an illustration of a communication system 100 capable of establishing, managing, and providing an online reputation of a client who is participating in one or more online forums, in accordance with one embodiment of the present invention. The communication system 100 is capable of enabling communication between one or more users that are coupled to the communication network 140, through their respective communication device. For example, in one embodiment, the communication network 140 is the internet, but could be any suitable network capable of supporting an online social networking sites or forums, hereinafter referred to as online forums.

In addition, communication network 140 supports multiple online forums a-n. The online forums a-n each function to enable a social network between users through the communication network 140. Online forum-a is representative of the online forums a-n, and for purposes of brevity and clarity, only online forum-a is discussed. The online forums can take any form or format. For example, in one type of social forum, users post messages under a username created when they register for the right to participate in the social forum. For the social forum, the files that are shared are the messages. In other social forums, visitors do not necessarily post messages, but visit the forum to retrieve information. In the case of a forum that is an auction service, the files are the "bids" made by the users of the auction service. Information in each of the forums about each of the users may be entered by the users themselves, or by other users, with authorization.

Some of the communication devices serve as what is called here a "file sharing access point," and operate at a uniquely resolvable location on the computer network, such as through a uniform resource locator (URL). These file sharing access points provide access to an online forum, each of which is identified by a forum name. The term "forum" should be understood here as indicative of a file sharing service provided by a forum provider, which service is made available via one or more servers acting as a file sharing access point.

Still other file sharing services are contemplated, such as those providing a global, decentralized, distributed internet discussion system for posting public messages to one or more categories, such as blogs, news sites, etc. For example, in case of the forum "usenet," cable providers are access points, instead of access through a URL. Usenet, a contraction of a user network, is a global, decentralized, distributed internet discussion system. Users read and post public messages—called articles or posts, and collectively termed news—to one or more categories, known as newsgroups. Usenet resembles bulletin board systems in most respects, and is a precursor to the various web forums which are widely used today.

Within a particular forum, users register as and are identified by a unique user identifier ("USERNAME"). In that way, participation by a particular user is through a corresponding user identifier. As such, other users can identify participation by other named users. In addition, the user identifier allows the forum provider, or manager, to exercise some degree of control over who has access to the file sharing service. Users who violate a forum's policy can be prevented from participation, at least through the participation of a corresponding user identifier. Additionally, through embodiments of the present invention, a forum manager would be able to prevent the participation of a particular user in the forum even though the user has changed their user identifier, as will be described in detail below.

In FIG. 1, server 150 is an exemplary access point, and supports online forum-a. Server 150 provides a means for users within a defined social network to interact and communicate with each other using whatever computing resource is available to the user in order to couple to and provide access the communication network 140. In that way, their related online forum-a is able to bring together multiple users that share common interests or affiliations. In the case of an online chat forum, users post messages under a user identifier created upon registration to the online forum. For instance, the online forum-a may be an investment forum that encourages users to discuss investment strategies. Other types of forums may include blogs that discuss various topics, including politics, gardening, sports, etc.

In another implementation, an access point may be a different server than the server(s) facilitating the forum, and in fact the forum may not actually be facilitated by any particular set of servers but may instead be facilitated by one or more access points, as described previously. For example, in case of the forum "usenet," cable providers are access points, instead of access through a URL.

As shown in FIG. 1, server 150 supports online forum-a and is representative of the servers supporting the other online forums a-n. Though shown as one block, server 150 may include one or more actual servers located in one or more locations, but act to provide server functionality to support the online forum-a.

As shown in FIG. 1, various participants of the forum are coupled to the communication network 140. Each of these participants is coupled to the communication network 140 through an associated computing resource (e.g., standalone computer, mobile laptop computer, mobile personal digital assistant, mobile phone, etc.) for purposes of connecting to an online forum a-n. For instance, users 110a-n are coupled to communication network 140. In addition, clients 120a-n are also coupled to communication network 140. Each of the users 110a-n is capable of participating in one or more online forums a-n. In addition, each of the clients 120a-n is capable of participating in one or more online forums a-n. As will be described more fully below, each of the clients 120a-n has registered with the online credential service supported by the set of servers 160 that is used to establish a corresponding online reputation for a participating client, and to enable access to that online reputation for purposes of verifying credentials of the client.

More particularly, server 150, as the host platform, is capable of supporting online forum-a. Participants may include combinations of the users 110a-n and clients 120a-n. In addition, server 150 includes a user profile manager 153.

For instance, the forum provider may require that a user of the online forum-a register with the forum. Registration includes the creation of a user profile by the user profile manager 153. Registration provides means for the forum provider, or a third party, to exercise some degree of control over who has access to the file sharing service, and more particularly, who can participate within the social network of the online forum.

In one embodiment, user profile manager 153 is capable of collecting user information that is associated with the corresponding user. In one embodiment, the user information is provided by the user (e.g., user name, local address, etc.), such as when the user registers with the online forum-a. In another embodiment, the user information is automatically collected. For example, the user information includes behavioral characteristics exhibited by the user, and other personal and biographical information associated with the user. Portions of this information can be used to establish and manage the online reputation of a particular user. For example, in embodiments of the present invention, behavioral characteristics that are exhibited by the user may include uniform resource locator (URL) histories, search histories, user action on the online forum, longevity of the user on the online forum, and other user transactions that may be relevant.

In addition, user profile manager 153 is capable of generating a user profile based on the user information. For instance, the user profile may include the user's name, address information, friend information, preferences, as well as other pertinent information. These user profiles are located in the storage module 155. In addition, portions of these user profiles are accessible to the general public. That is, certain information in the user profile is accessible by third parties. For instance, certain information in the user profile of a particular user is accessible by other users of the online forum for use in determining the user's background. This information is also used for purposes of creating an online reputation and for verification of the online reputation.

Server 150 that supports the online forum-a also includes a social networking manager 156. The social networking manager, among other duties, is capable of monitoring the communication of the online forum-a, and if necessary making the decision on whether to kick out a particular user. For instance, if it is found that one online user is exhibiting bad behavior, or violating the rules of the forum, the manager 156 is able to delete the registration of that particular online user, in order to prevent that online user, through his or her corresponding forum specific USERNAME, from participating in the online forum-a.

In addition, communication system 100 includes an online credential service that serves to manage and support online reputations of clients. The online credential service is supported by server 160 (also referred to as, "SERV 160"). Though shown as one block, server 160 may include one or more actual servers located in one or more locations, but act to provide server functionality to support the online credential service. More particularly, the online verification service supports the creation of the online reputations of the clients a-n that are participating in one or more online forums a-n. In addition, the online verification service 160 provides for the verification of the online reputation of those clients 120a-n who are participating in one or more online forums a-n.

Specifically, server 160, supporting the online credential service (e.g., CredMe.com), includes a client manager 162 for providing a client identifier that is unique and associated with a client. Specifically, within the credential service, a client is distinguished through a corresponding and unique client identifier. Server 160 also includes a forum manager 163 for providing a plurality of forum identifiers, each of which is unique, for a plurality of online forums within which the client is participating. The client is associated with a plurality of user profiles used by the client to participate in the plurality of online forums.

Additionally, server 160 includes a code generator 164 provides a plurality of verification codes, each of which is unique, for a client. The verification codes are based on the plurality of forum identifiers and the client identifier. The verification code is used to establish and verify the online reputation of a particular client for a particular online forum. A sequence generator 165 provides a plurality of verification sequences for purposes of verifying the plurality of user profiles of the client in the plurality of online forums. Each of the plurality of verification sequences includes a corresponding verification code. In one embodiment, the verification sequence is the verification code. For instance, the credential service is able to verify the credentials of a client for a corresponding forum, as long as the client includes the verification sequence in the user profile of the client in the forum.

Server 160 also includes a reputation manager 166 for verifying a plurality of credentials associated with the plurality of user profiles of a corresponding client. The reputation manager 166 is able to provide an online reputation of the client that includes verified credentials associated with the plurality of user profiles for the various forums within which the client is participating. More particularly, the verified credentials that establish the online reputation are anonymously presented. Specifically, a request processor (not shown) receives a request including a corresponding verification sequence from a verifying entity for an online reputation of a client. The request is associated with an online forum within which the client and the requester is participating. Information about the client (e.g., user identities or usernames) that is associated with online forums, other than an online forum through which a request for verification of a client's online reputation is made, is not revealed.

General Process for the Management and Verification of a Reputation Profile

Figure 2:
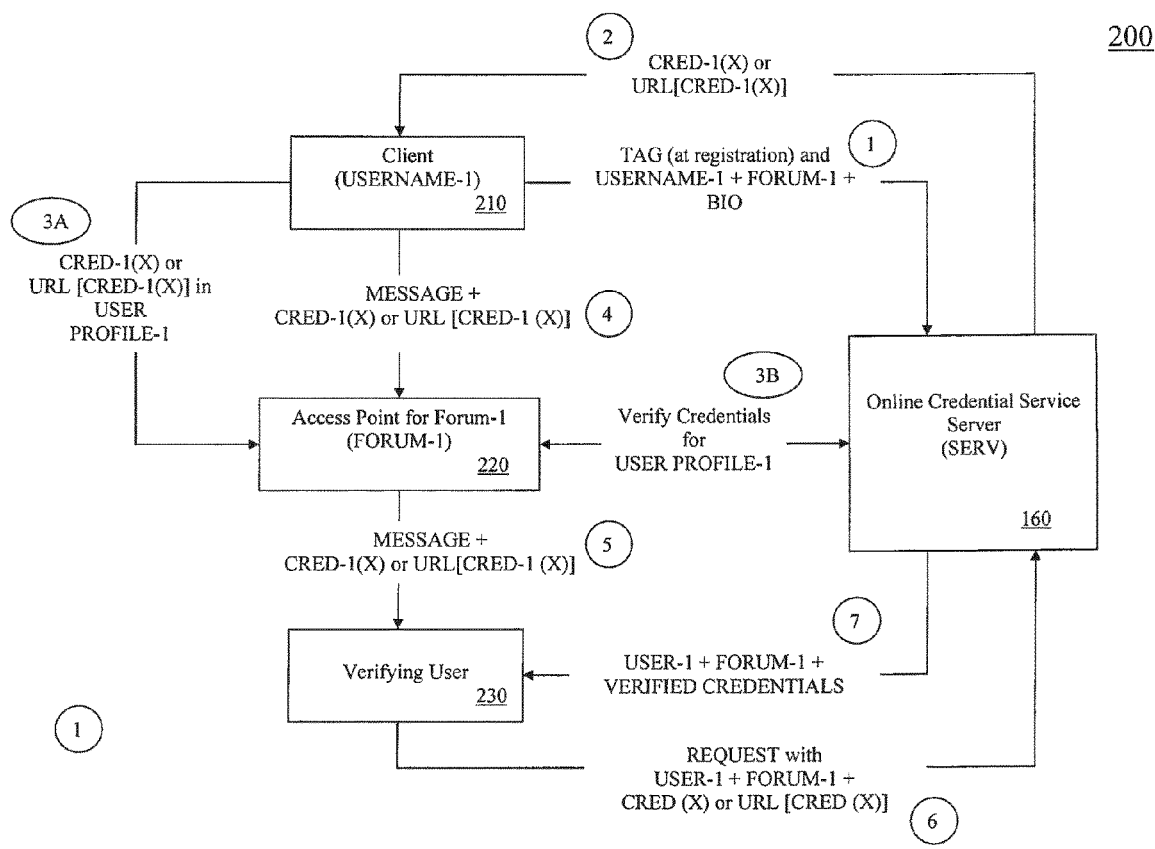
FIG. 2 is a data flow diagram illustrating the flow of information in establishing, managing and distributing the online reputation of a client participating in one or more online forums, in accordance with one embodiment of the present invention.

FIG. 2 is a data flow diagram illustrating the flow of information in establishing, managing and presenting the reputation profile of a client participating in one or more online forums, in accordance with one embodiment of the present invention. For background, a networked-connected credential server (SERV) 160 supports an online credential service and manages digital credentials of a client 210 for purposes of establishing, managing, and presenting a reputation profile of the client 210. The reputation profile is representative of the online reputation of the client 210. In addition, SERV 160 establishes, manages and presents reputation profiles of other clients, each of which participates in one or more online forums.

As shown in FIG. 2, client 210 is participating in a forum (FORUM-I 220). Client 210 accesses FORUM-I 220 as USERNAME-1 via a website, or more generally, via a file sharing forum access point. Client 210 also participates in other forums, each of which requires a corresponding user identifier. For instance, client 210 may participate in another forum (FORUM-2) as USERNAME-2.

In general, SERV 160 provides anonymous digital credentials (e.g., CRED) to client 210 for purposes of verification of client 210, and more particularly verification of client credentials in association with FORUM-1. The digital credential (CRED) is created as a result of a registration process with SERV 160 that is initiated by the client to register a combination of the client 210 and FORUM-1 for purposes of establishing, managing, and presenting a reputation profile of client 210. For instance, client 210 may provide to SERV 160 some tag information (TAG), such as a cell phone number, a forum identifier associated with FORUM-1, and the user identifier (USERNAME-1) used to identify client 210 in FORUM-1. The TAG information ties the client 210 to some real entity who has an account at SERV 160. Specifically, client 210 is associated with a client identifier (PERS) which identifies the account at SERV 160 that provides a reputation profile for client 210. Specifically, CRED is used by client 210 when posting messages in FORUM-1.

In addition, biographical information (BIO) may be provided to SERV 160 by client 210. In one case, BIO includes general information known to SERV 160 that is associated with client 210. In another case, BIO includes specific biographical information associated with a corresponding forum (e.g., FORUM-1).

When client 210 posts a message (MESSAGE) with FORUM-1, client 210 posts CRED, or something that is based on CRED, along with the MESSAGE. As such, when another user 230 views MESSAGE, the user can request verification of the reputation profile of client 210, using CRED. Such a request can result in BIO being provided to the other user 230, which can include general biographical information, or specific biographical information of client 210 relating to FORUM-1.

In the first step, client 210 is communicatively coupled to SERV 160 through a communication network (e.g., network 140). In addition, client 210 is participating in FORUM-1 as USERNAME-1. The user identifier may be a pure user name ("jdoe"), or an email address Gdoe@forum-1"), or any other identifier that is recognizable by FORUM-1 and associated with client 210. In addition, client 210 is communicating with SERV 160 for purposes of registering FORUM-1 to enable a reputation profile of client 210 to include FORUM-1.

At step 1, tag information (TAG) is provided by client 210 to SERV 160. TAG is used by SERV 160 to either register client 210 for the first time to the credential service, or to enable client 210 to interface with the credential service for purposes of managing a corresponding reputation that is associated with a client identifier (PERS). The credential service is able to uniquely identify the client, and its client identifier PERS, through the tag information. For example, a landline home phone number, cell phone number, biometric data (e.g., fingerprint, eye print, etc.) could be used as tag information.

As such, in some embodiments, TAG is used as an alias for the client identifier (PERS) at the credential service. Specifically, PERS is tied to TAG (e.g., mapping) in order to secure the login/registration process with SERV. If TAG is not associated with an existing PERS, a new PERS is created upon registering the client to SERV.

In the case where a user is trying to access an existing account of the credential service under an existing PERS, SERV must still verify that the person keying in TAG is in fact the owner of the account associated with PERS to provide access to the credential service. This can be done through a password (PASS), in the following manner. Upon signing into the credential service, a client may supply TAG (e.g., cell phone) and optionally, PASS. For example, the client may sign in to register a particular online forum in order to receive a corresponding CRED. If TAG and PASS are valid, then the client is identified, admitted, and associated with a corresponding client identifier (PERS).

On the other hand, if PASS is not supplied or is invalid, a push or pull procedure may be implemented to verify the identity of the person signing in onto the credential service. For instance, in the push procedure, TAG is supplied by the client to the credential service (SERV) for purposes of registering a forum having a forum identifier (FORUM-1), wherein the TAG is a cell phone. This information is typically sent via a client device used for accessing the internet and communicating with SERV. SERV identifies the client identifier (PERS) by the TAG, and computes a verification code (CRED-1) based on PERS and FORUM-1. SERV then sends, or pushes, the verification code back to the client, and more specifically to the cell phone associated with TAG. It is important to note that for purposes of identifying the client, other codes or keys can be used, instead of the verification code. Typically, the client would have control over the cell phone, and only the client would the purpose of the communication from SERV (e.g., no further instruction is provided with the verification code). The client acknowledges receipt of the verification code by keying in the verification code into the client device, and sending the verification code back to SERV. If SERV can confirm that the verification code supplied by the client is the same as the verification code sent to the client, then the client would be further identified as PERS.

As an alternative, in what might be called a pull procedure, SERV sends the client a code (or key) via the client device. The client acknowledges receipt of the code and sends the code via the cell phone, that is associated with TAG, back to SERV. This acknowledgement message may be in the form of a text message. SERV can again confirm that the code supplied by the client is the same as the code sent to the client. In addition, SERV can further confirm that the code was sent via the specific cell phone associated with TAG, and as such, the client would be further identified as PERS. It is assumed that the client has control over that cell phone.

Also, SERV 160 assigns a client identifier (PERS), if this is the initial registration process for client 210. That is, if TAG is not recognized by SERV 160, this indicates that client is performing an initial registration process with the credential service. PERS uniquely identifies the client 210 within the credential service. As such, each client within the credential service is associated with a unique PERS. PERS is typically not revealed to client 210, nor to the public. As such, PERS can be used to create anonymous digital credentials used for verification of a reputation profile of the client, as will be described below. In one embodiment, client 210 is not identified by another user identifier with regards to SERV 160.

In addition, SERV 160 may ask for biographical information (BIO) from client 210, to include typical registration information. BIO may be used for purposes of developing the reputation profile of client 210. In addition, client 210 at the time of registration may indicate rules (hereinafter referred to as "privacy rules") for disclosing information in BIO, when providing information related to a reputation profile of client 210.

On the other hand, if TAG is recognized (e.g., posted in a data store, that includes other biographical information related to client 210), then client 210 already is registered with the credential service and is associated with a predefined PERS. As such, SERV 160 can proceed using that PERS to register the corresponding forum (e.g., FORUM-1)

that client 210 would like included within his or her reputation profile. At this time, other biographical information may be provided by client 210 to SERV 160 that is related to the corresponding forum, which client 210 is registering. For instance, biographical information may include registration information, such as registration date. The biographical information may also include birth date, gender, phone number, street address, city, state, postcode, country, degrees, and professional certifications.

In at least some embodiments, SERV can offer client 210 the option of using the same BIO information that is associated with client 210 through the previous registration of one or more forums, to use general biographical information related to client 210, or to use biographical information of the client that is related to the current forum. The previous biographical information could be obtained through the use of TAG, or PERS, to identify all forums related to client 210. In addition, client 210 may indicate which biographical information should be revealed. Also, client 210 may indicate which information, used as credential information, that is related to the current forum being registered is provided within his or her reputation profile.

In one embodiment, the TAG information is preserved. That is, instead of storing the actual tag information TAG, SERV 160 stores a hash or digest of the tag information in TAG. This conceals TAG and provides a digital identifier of some standard length.

In the second step, client 210 requests SERV 160 to provide an anonymous digital credential string (CRED-1) that is associated with FORUM-1. Throughout the Application, the digital credential string is also referred to as a verification code. Importantly, CRED is provided without any reference to any identifying information, such as TAG or the client identifier, PERS. As such, client 210 is able to anonymously use CRED-1, with respect to his or her participation in FORUM-1, such that the real identity of client 210 is preserved. Specifically, SERV 160 checks to see if client 210, as identified by PERS, has requested a credential string for FORUM-1 before. If the client associated with PERS has not requested a credential string before for FORUM-1, then CRED-I is created for FORUM-1 for client 210, based in part on PERS and FORUM-1. That is, CRED-1 is created from a function of PERS and FORUM-1.

Figure 3:
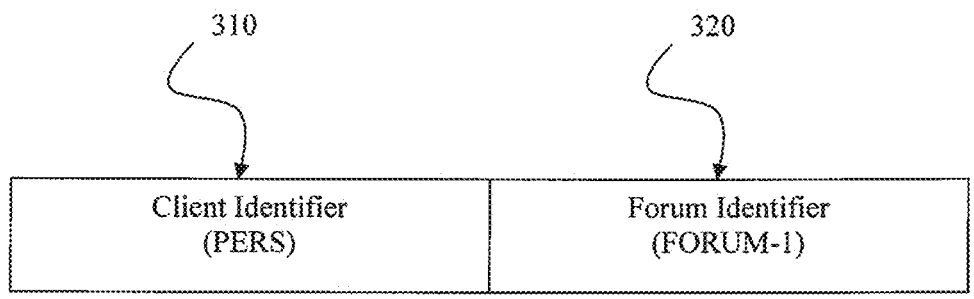
FIG. 3 is a diagram illustrating a verification code used for establishing the online reputation of a client, in accordance with one embodiment of the present invention.

For instance, FIG. 3 is a diagram illustrating an exemplary digital credential string or verification code 300, in accordance with one embodiment of the present invention. As shown, verification code 300 includes client identifier (PERS) 310 concatenated with the forum identifier (FORUM-1), in one embodiment. Since both the client identifier 310 and the forum identifier 320 are unique, within the context of the credential service (e.g., CredMe.com), the combination is also unique within the credential service. These identifiers may be alphanumerics, numbers, label, name, or other representations suitable for use as identifiers. As such, for every online forum that a particular client would like verification of credentials, there is associated a unique verification code. In addition, this verification code is unique across all the verification codes associated with all the other clients supported by the online credential service. As will be described more fully below, the verification code is used for purposes of verifying the reputation profile of the client.

For added security from disclosing the true identity of the client, the information in the verification code may be hashed. For instance, a hashing algorithm may be performed on the information for purposes of securing the underlying information (e.g., PERS and FORUM-1). Since the underlying information in the verification code is unique, the verification code that includes hashed information also uniquely identifies the combination of the client and the corresponding forum. As such, by protecting the secrets for decrypting the hash algorithm, only the credential service is able to obtain the underlying information (e.g., PERS and FORUM-1) for purposes of establishing and managing the reputation profile of the client.

In another embodiment, the verification code does not include PERS or FORUM-1, but can be mapped to that information. The verification still uniquely identifies the relationship between PERS and FORUM-1, but requires further operations to discover that relationship. For instance, the verification code may be mapped to PERS and FORUM-1 at the credential service.

In still other embodiments, other functions involving the client identification number 3 I 0 and the site identification number 320 are supported. In particular, in one embodiment, SERV 160 creates a new and unique alphanumeric ten-character string X, that is based on PERS and FORUM-1. As such, X is a function of PERS and FORUM, or, symbolically, X=X(PERS, FORUM). More specifically, X maps back to PERS and FORUM. For instance, SERV 160 may maintain a data store of X values, which also maps back to the corresponding FORUM and PERS. On the other hand, if X has been created for client 210 that is associated with PERS, then SERV retrieves the string X.

For purposes of anonymity, the use of X as the credential string, CRED-1 that is associated with FORUM-1, is sufficient to hide the true identity of the client 120. That is, since CRED-1 is a function of PERS and FORUM-1, as long as the function is protected, then the identity of client 120 (e.g., PERS) is also protected, especially if the function includes a hashing function. However, additional steps may be taken to provide additional layers that protect the true identity of client 120.

For instance, in another embodiment, the credential string or verification code (CRED) includes two parts, X and Y. Specifically, SERV 160 computes another ten-character string Y, that is based in part on X, FORUM-1, and USER-NAME-1. As an example, Y can be a non-invertible, or one-way, function of X, FORUM-1, and USERNAME-1. For instance, a hash function, as a non-invertible function, may prevent a hacker from inverting the function to reveal information leading to the true identity of client 120. In one implementation, Y=TRUNC (SHA1 (X+FORUM+USER)), where SHAI is Secure Hash Algorithm 1, designed by the National Security Agency NSA, and TRUNC is a function that truncates the output of SHAI to some predetermined number of characters (e.g., ten characters).

Hash algorithms compute a fixed-length digital representation (known as a message digest) of an input data sequence (the message) of any length. They are called "secure" when it is computationally infeasible to either find a message that corresponds to a given message digest, or find two different messages that produce the same message digest. In addition, any change to a message will, with a very high probability, result in a different message digest. In one case, SHA-1 produces a message digest that is 160 bits long.

In still another embodiment, for additional security, SERV 160 may use a secret key in calculating Y. The key typically is not less than 500 bits in length, in one embodiment. As such, Y may be using the following relationship: Y=Y (USER-1, FORUM-1, X, KEY). More specifically, Y may be calculated as the SHA1 hash of the concatenation of X+FORUM-1, USER-1, and KEY. Again, the result may also be truncated down to ten characters in length.

In one embodiment, the verification code (e.g., CRED-1) is a function of X and Y. For instance, CRED-1 is the concatenation of X and Y, and so typically a 20-character string. In this case, CRED-1, when decoded provides information related to X, Y, FORUM-1, USERNAME-1, and PERS. This information can be used to verify client 120 (e.g., PERS), X, as well as the other information contained in CRED-1.

While certain embodiments of the present invention describe X and Y in the anonymous digital credential as each being ten characters in length, it should be clear from the foregoing that X and Y need not be precisely the length mentioned above. The length of the X component and the Y component indicated above is merely illustrative of a possible embodiment of the invention.

SERV 160 then provides one or more of the following to client I 20, as a verification sequence that includes CRED-1. In one case, the verification sequence is CRED-1, and is in the form of the 20-character credential string, previously described. In other embodiments, the verification sequence that includes CRED-1 is in the form of a URL. In one case, the verification sequence is a URL that contains parameters FORUM-1, USER-1, X, and possibly Y. Additional information may be included that includes an indicator that the reply should be in text form or image form (e.g., an image of client I 20). By combining the text and image form, the verification sequence can include an image that is both viewable, and clickable, as providing a link to biographical information. In still other embodiments, SERV 160 does not display all of the above options. In such embodiments, SERV 160 generates CRED-1, and then shows how to embed CRED-1 in some useful URLs, as will be described below.

In the third step, 3A, client 210 includes some form of CRED-1, or a verification sequence, in the user profile associated with client 210 (USERNAME-1). As stated before, the verification sequence may be in the form of one or more of the following: CRED-1 or a URL that embeds CRED-1.

Also, in step 3B, this information is used by the credential service, supported by SERV 160, to verify that client 210 is still participating in FORUM-1, that the information provided in the user profile is still valid, as well as other information associated with the participation of client 210 in FORUM-1, such as length of time that USERNAME-1 has been verified by the credential service. Specifically, credential service looks to verify that the information is included in the user profile (e.g., USERNAME-1). If still included, that implies that the client 210 is still a valid user of FORUM-1, and that the forum manager has not restricted or prevented client 210 from participating in FORUM-1. In that case, client 210 has been successfully verified as having a valid user profile, and by implication other credentials associated with the user profile have also been verified (e.g., rating of the client in FORUM-1).

In the fourth step, client 210 visits FORUM-1 in order to participate in FORUM-1, such as providing a MESSAGE. In the present embodiment, the verification sequence is also displayed in or near the content of the means for participation by client 210 (e.g., MESSAGE). For instance, the verification sequence is displayed near the MESSAGE posted by USERNAME-I in FORUM-I. As stated before, the verification sequence may be in the form of one or more of the following: CRED-1, or a URL that embeds CRED-1. In one case, if FORUM-1 does not permit the posting of images, client 210 may opt to simply display a raw URL instead of the image.

In still another embodiment, it is important to note that the client 210 may not actually post CRED-1 or the URL that includes CRED-1, as described previously. Instead, FORUM-1 may ask client 210, as USERNAME-1, for the credential string CRED-1, such as upon registration with the forum, or as a setting in the account or user profile for client 210. Then, FORUM-1 creates the appropriate URLs for USERNAME-1 automatically, whenever USERNAME-1 posts a message.

In the fifth step, other users accessing FORUM-1 are able to view content (e.g., MESSAGE) posted by USERNAME-1 that is associated with client 210. Since client 210 is a participant in the credential service supported by SERV 160, the content also is associated with a verification code or sequence. In one embodiment, the verification sequence is in the form of a URL that includes CRED-I (e.g., clickable image, or URL). As these other users either view the image or click the URL, a request is sent by a verifying user 230 to SERV 160 to view the reputation profile of client 210, in the sixth step. For instance, the request includes information, such as USERNAME-1, FORUM-1, CRED-1, or the URL that includes CRED-I.

In the seventh step, SERV 160 receives the request for the reputation profile of client 210. SERV 160 splits CRED-1 into its respective X and Y components, in one embodiment. In addition, SERV 160 is able to verify the Y component, by comparing the X, included in Y, with the X included in CRED-1. In addition, SERV 160 can also verify that the USERNAME-1, and FORUM-1 are valid. Also, SERV 160 verifies that X corresponds to an actual client, by breaking out PERS, and FORUM-1 from X (e.g., through decoding or mapping). That is, SERV 160 verifies that X corresponds to client 210.

SERV 160 responds to the verifying user 230 with the reputation profile of client 210. Specifically, SERV 160 provides verified credentials of client 210 with respect to FORUM-1, as well as all the other forums that client 210 is participating within. For instance, the reputation profile may contain legible text or images that indicates information related to a corresponding forum and username. As an example, the reputation profile for FORUM-1 may include the chess ranking of client 210, as a verified credential, where FORUM-1 is a chess forum where participants may play chess against each other. In addition, the reputation profile may also include other biographical information from the account associated with client 210, as identified by PERS. The biographical information may be restricted by privacy rules, set forth by client 210. For instance, using the above example of a chess playing forum for FORUM-1, if the verified credential is a person's ranking, and client 210 has requested that this should be private information, then the ranking of client 210 is not included in the corresponding reputation profile of the client.

The verifying user 230 is able to audit the anonymous digital credentials included in the reputation profile of client 210. For instance, the verifying user 230 can compare the client identifier, USERNAME-1, that is associated with the participation in FORUM-1, against the username displayed as part of the anonymous digital credentials of the reputation profile. If the two are not the same, the verifying user 230 knows that client 210 has multiple identities associated with the FORUM-1, which may be because client 210 has previously been kicked off the forum, and is trying to leverage the reputation profile of client 210, but using a different username in FORUM-I. On the other hand, if the two usernames align, then the verifying user 230 understands that is reasonably likely that client 210 is not a former user who has invented a new persona.

Anonymous Credentials

Figure 4:
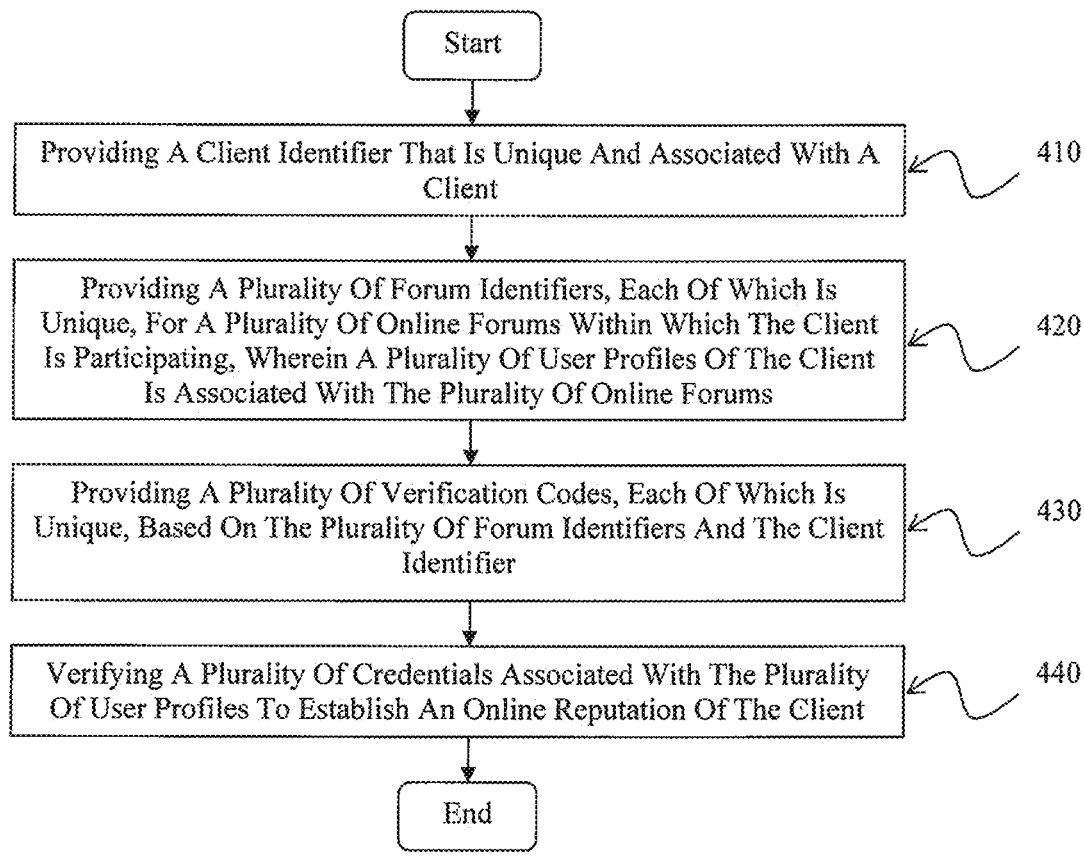
FIG. 4 is a diagram illustrating a method for creating an online reputation of a client, in accordance with one embodiment of the present invention.

FIG. 4 is a flow diagram 400 illustrating a method for creating a reputation profile of a client participating in one or more online forums, in accordance with one embodiment of the present invention. The method of flow diagram 400 is implemented within the framework of data flow diagram 200, in one case. Also, flow diagram 400 can be implemented within the communication network of FIG. 1, and more specifically, by the online credential service supported by SERV 160 for purposes of verifying credentials of a client, and for providing a reputation profile of the client based on the verified credentials. That is, implementation of the features illustrated in flow diagram 400 is provided by the online credential service (e.g., with domain name Cred-Me.com) of FIG. 1, in one embodiment. As such, creation and verification of a reputation profile is provided for each of the clients 120a-n coupled to the communication network 140 of FIG. 1. As such, a verifying user (e.g., one of users a-n or clients a-n) of one of the online forums a-n, as shown in FIG. 1, is able to access the reputation profile of a client that is also participating in that online forum, as will be further described below.

For purposes of brevity and clarity, the discussion provided below is directed to a particular client that is participating in one or more online forums, but is intended to apply to each of the clients, participating in various online forums, supported by an online credential service. As such, the discussion related to a particular client creating and providing verification of a corresponding reputation profile is intended to apply to all clients that are authorizing the creation and verification of a corresponding reputation profile.

At 410, a client is authorizing the creation and subsequent verification of a corresponding reputation profile through a trusted third party, such as the online credential service. The reputation profile is reflective of the online reputation of the client. In particular, a client identifier is provided in association with the client. The client identifier is unique within the system of the online credential service. As such, each client supported by the online credential service is uniquely identified by a corresponding client identifier. As described previously, the client identifier is referred to as PERS, and is typically not publicly revealed, since PERS is used, in part to create, verify, and manage the reputation profile of the client. In one embodiment, the client identifier is a number. In other embodiments, the client identifier can take any form, as long as it uniquely identifies the corresponding client within the online credential service.

At 420, a plurality of forum identifiers is provided for a plurality of online forums within which the client is participating. Each of the forum identifiers, previously referred to as "FORUM," is unique within the system providing online credential services, and can be of any format (e.g., forum name, alphanumeric, number, etc.). For instance, notification is received from the client of an online forum. In particular, the client is authorizing the verification of credentials with respect to his or her activities associated with the online forum. The notification may include the domain name of the online forum. As the client provides notification of additional online forums for purposes of verification of credentials with respect to activities by the client on those additional forums, an overall reputation profile of the client can be established and managed.

In addition, a plurality of user profiles is associated with the plurality of online forums. That is, for each online forum, the client maintains a corresponding user profile. In that manner, activity of the client can be associated with the client, and any activity is capable of being monitored by the forum manager.

At 430, a plurality of verification codes is provided that is based on the plurality of forum identifiers and the client identifier. Each of the verification codes is unique within the context of the system providing online credential services, and can be of any format (e.g., forum name, alphanumeric, number, etc.). Each verification code is based on the client identifier and a corresponding forum identifier.

Previously referred to as "CRED," each verification code is an anonymous digital credential (e.g., string of values) that, in some form, is used to verify credentials of the client with respect to a corresponding online forum. More specifically, the verification code is used for purposes of securely and anonymously verifying that the client is participating within the corresponding online forum (e.g., verify that the verification code is included in a corresponding online forum). That is, a verification code that is used in association with verifying credentials of a client with respect to a particular online forum, does not provide any information leading to the user identities of the client with respect to other online forums that the client is participating, nor does it lead to the real identity of the client. Further a collection of verification codes would also not provide information leading to the user identities of a particular client. In this manner, the reputation of the client to that particular forum can be established and monitored.

At 440, a plurality of credentials associated with the plurality of user profiles is verified, for purposes of establishing a reputation profile of the client. Specifically, for each user profile of a corresponding online forum, one or more credentials can be verified and used to establish a reputation profile of the client. For example, a verifiable credential of a client participating in an auction site could be a rating given to users of the auction site (e.g., "A" rating as the highest rating, "B" rating, etc.). Another verifiable credential is the longevity of a client's verified participation, by the credential service, in a corresponding online forum. The longer a client has been participating in one or more online forums, the better the reputation for the client. By combining verified credentials from all user profiles associated with online forums that the client is participating, an overall reputation profile of the client is established that is representative of the online reputation of the client. Other examples of verifiable credentials are shown in FIG. 6.

Verifying User Profiles and Corresponding Credentials

In one embodiment, verification of the credentials for a particular forum is performed by verifying that the corresponding verification code, CRED, is included within the corresponding user profile, and then capturing the information associated with the credential. A user profile that is valid through verification of the inclusion of the verification code indicates that the client is actively requesting and authorizing the inclusion of credentials associated with the user profile in a corresponding reputation profile. Also, once it has been verified that the user profile is valid, then information in the user profile is also presumed to be valid. As such, corresponding credentials, based on the information in the user profile, have by implication been verified and can be captured.

In one embodiment, presentation of the verified credentials is subject to the privacy rules, as set forth by the client. As previously described, the client is given the option to restrict the publication of various credentials used by the online credential service to establish and manage the reputation profile of the client. That is, the client may elect to prevent the use of a verifiable credential, or other information (e.g., biographical information) of a corresponding online forum that is used to support the reputation profile of the client. For example, a reputation profile requested from one online forum may not include the rating (e.g., chess rating), as a verified credential, of the client that is associated with that forum. Also, a reputation profile requested from one online forum may include the client's age, or at least what was reported within the context of registering with the credential service or the corresponding online forum, while another reputation profile requested from another online forum may restrict publication of the client's age.

In addition, the verification code may be embedded within another form for purposes of both verifying credentials, and also for providing a means for requesting the reputation profile of the client. As such, a plurality of verification sequences is provided to the client. Each verification sequence includes a corresponding verification code. That is, each verification sequence is uniquely associated with a particular online forum, through its association with the corresponding verification code. In one implementation, the verification sequence is the verification code.

The verification sequence may take the form of a link, or tag, in some embodiments. As described above, the link or tag includes the verification code that uniquely identifies the relationship between the client and the corresponding online forum. In addition, some association can be made between the verification sequence (e.g., in the form of the link or tag) and any participation within the corresponding online forum by the client. For instance, the verification sequence is included or presented with any MESSAGE that is made by the client within the corresponding online forum. As such, any user viewing the MESSAGE can use the verification sequence to request the reputation profile of the client (e.g., click on link), as will be further described below.

In addition, the verification sequence that includes the verification code may be used for verification of credentials of a corresponding user profile that is associated with a corresponding online forum. The process for verification is analogous to that using the verification code for verification of credentials, as described previously. Specifically, in order to verify the validity of the corresponding user profile, the verification sequence is included in the corresponding user profile. The user profile is used by the corresponding online forum to manage participation by the client. If the client loses authorization to participate in the online forum, then that client's user profile for that online forum will reflect the loss of authorization (e.g., deletion of the user profile). As such, the online credential service is able to securely and anonymously verify that the client is participating within the corresponding online forum, by verifying the presence of the verification sequence. By implication, corresponding credentials associated with the corresponding online forum and the client have been verified and can be captured.

In one embodiment, verification of credentials is performed with authorization from the client. Specifically, upon authorization of the client, the credential service is able to access information in a user profile of a corresponding online forum for purposes of both verifying the validity of the user profile and the credentials associated with that user profile.

For instance, in one implementation, a script (e.g., application) resides on a client device. The script is loaded upon authorization by the client, such as upon registering with the credential service. This script can be located on the desktop or within the browser used by the client to access the communication network (e.g., internet). For example, the script is a bookmark in the browser, in one implementation. The script is capable of running in the background for purposes of verifying the user profiles and credentials of the client in the various online forums within which the client is participating. The script is also capable of being activated by the client for purposes of verifying user profiles and credentials. As such, the script understands which online forums are registered with the client for purposes of supporting a reputation profile of an online reputation.

In one implementation, the script may activate whenever the client is actively participating within a corresponding online forum to determine if the user profile and associated credential or credentials need re-verification or to determine whether the client would like to register the forum for purposes of supporting a reputation profile. For example, if the user profile and associated credentials have not been verified after a period of time (e.g., over a threshold period), then they need re-verification. Also, if the forum has not been registered, the script may notify the client of such status and implement the process of registration upon authorization. In either case, at that point, the script may then instruct the client to access the corresponding user profile, if not currently accessed, or the script may provide a link (e.g., button or hyperlink) to the corresponding user profile.

In another implementation, instead of automatic activation and implementation, the script is activated by the client for purposes of registering an online forum with the credential service or for reverifying an online forum. For instance, a client may be visiting a particular online forum, and may independently choose to activate the script (e.g., activation of a bookmark) to either register the online forum or to reverify credentials in the online forum. While activation may occur on any visited page of the online forum, implemented processes will depend on from which page activation occurred. For instance, if activation occurred while visiting a user profile page, then the script may begin downloading (e.g., scraping) information from the user profile for use in registration of the forum or for reverifying credentials in the reputation profile of the client. If activation occurred while visiting a more generic page, then the script may prompt the user to visit the user profile in order to scrape information.

Once the page with the user profile is accessed, the script then prompts the client to provide authorization for the script, on behalf of the credential service, to scrape the user profile for verification purposes. For instance, an action by the user is necessary to provide the authorization (e.g., click on a button icon). The client may have implicitly given authorization where the script was activated by the client for purposes of reverification of credentials or registration, as described above, and as such the script may automatically begin scraping information. In addition, the prompt may ask the client to verify that the page is for the correct user profile. Upon authorization, the script scrapes all relevant information from the user profile and sends it back to the credential service. As such, the credential service is able to determine if the verification code, or verification sequence, is included in the user profile for verification purposes.

Once the user profile is registered, validated or re-verified, by implication other associated credentials (rating, biographical information, etc.) are also valid and re-verified, and can be captured and included as part of a corresponding reputation profile. On the other hand, if the user profile cannot be validated or re-verified, then the corresponding online profile and associated credentials, if not already, are in danger of being downgraded or removed from the reputation profile of the client. This situation may arise when the user profile has been removed by the forum manager for misconduct, such that the client may not participate in that online forum using that user profile.

In addition, the script may prompt the client to access a particular forum for verification purposes, even if the client is not currently accessing the forum. For instance, if the period since the last verification of the user profile of that forum for that client exceeds an threshold period, the script may provide a prompt for the client to take action to re-verify the corresponding user profile and associated credentials. Also, if the script determines that the client is accessing an online forum that is not registered with the credential service, the script may prompt the user to register the corresponding online forum.

In still another embodiment, an automatic robot is configured to grab the profile page of the corresponding client, without user interaction, for re-verification purposes. The robot is able to parse the user profile to determine if the verification code or verification sequence is in the user profile. The process of verification and re-verification of the corresponding user profile and associated credentials have been previously described, and is applicable here. This re-verification process may be performed on a periodic basis Accessing a Reputation Profile Using a Verification Sequence Also, in another embodiment, the verification sequence is used to enable users of online forums to request access to the reputation profile of a particular client, as provided by the online credential service. For instance, a request or query for verification of a client's reputation profile is received by the online credential service, wherein the request includes a corresponding verification sequence from a verifying user. The request is made in association with a specific online forum within which the client and the verifying user are participating. As an example, the verifying user may be viewing a MESSAGE attributed to the client, and included or associated with the MESSAGE is a verification sequence to trigger the request.

The verification sequence may be represented in any format, suitable for passing information over a communication network (e.g., internet). For instance, the verification sequence may be included in a URL using various protocols, such as a hypertext transfer protocol (HTTP), or file transfer protocol (FTP), file protocol, etc.

Information included in the verification sequence includes one or more of the following: the user identifier (e.g., USERNAME), the corresponding forum associated with the verification code in the verification sequence (e.g., FORUM), and the verification code (e.g., CRED). In one embodiment, the verification sequence may only include the verification code, from which the online credential service is able to determine the user identifier and the corresponding forum.

As a representative example, the verification sequence is formatted according to the following URL as an HTTP request, where the requisite information is found in directories, or more particularly a directory path.
    http://CredMe.com/verify/FORUM/USERNAME/CRED
To the credential service, the path may not be as important as the information contained in the directory path. For instance, the URL includes a representation of the online forum ("FORUM") from which other users can access the reputation profile of the client. In addition, other information in the URL identifies the registered user identifier ("USERNAME") of the client through which the client is able to identify himself or herself in the corresponding online forum. Further, the verification code ("CRED") that uniquely identifies the relationship between the client and the requested client is provided. As a specific example, a username corresponding to "j Smith" in association with the client's participation in the online forum, FORUM-1.com, in which the verification code is "2094594," is provided below:
    http://CredMe.com/verify/FORUM-.com/j Smith/2094594

It is important to note that the in other embodiments, the URL may not necessarily include the verification code, "2094594." In that case, a reputation profile of the client is still accessible through the URL. For instance, a URL without the verification code for FORUM-1.com, is provided below:
    http://CredMe.com/verify/FORUM-.com/jSmith/
Other verification sequences to other online forums within which the same client is participating are provided below. The verification sequences are presented in URL format, where the information is also included in the directory path.
    http://CredMe.com/verify/FORUM-2.com/johnS44/3655127; and
    http://CredMe.com/verify/FORUM-3.com/scuba8/7315931.
For instance, the same client is participating in the online forum, FORUM-2.com, using "johnS44" as the user identifier. In addition, the client is participating in the online forum, FORUM-3.com, using "scuba8" as the user identifier.

In another embodiment, the verification sequence is of a format that includes an email address that identifies a user identifier and a forum identifier. As such, the verification sequence, in URL format, in one implementation, would be of the following format:
    http://CredMe.com/verify/USER@FORUM/CRED
As further examples, other verification sequences that include the client's email address as a user identifier for other online forums are provided below:
    http://CredMe.com/verify/cwalkn@hatmail.com/4376781; and
    http://CredMe.com/verify/pizza424@zmail.com/7189232.
Still other embodiments support verification sequences that are URLs where the requisite information (USERNAME, FORUM, and CRED) is found in the domain name itself, or is data. In a preferred embodiment, requests for verification of credentials are made via an HTTP request to a domain operated by SERV. As before, the parameters USERNAME, FORUM, and CRED for a corresponding online forum and client must appear somewhere in the request. As a representative example, the verification sequence is formatted according to the following URL as an HTTP request, where the requisite information is found in directories, or more particularly a directory path.
    http://CredMe.com/USERNAME/FORUM/CRED/FORM.
In another example, the verification sequence is formatted according to the following URL as an HTTP request, where the requisite information is found as data.
    http://CredMe.com/?USER/FORUM/CRED/FORM
In still another example, the verification sequence is formatted according to the following URL as an HTTP request, where the requisite information is found in the domain name.
    http://FORM.CRED.FORUM.USER.CredMe.com/
In addition, in other embodiments, the request to verify CRED and provide BIO may also include a format parameter (FORM) that contains a mime-type (such as IMG, HTM, XML or TXT) or other indicator of the desired format of the reply. For instance, in the above three examples of HTTP requests, the FORM parameter is included as a directory, as data, or within the domain name, respectively.

In addition, the verification sequence may include an additional parameter that specifies exactly which credentials the requesting party wishes to see in the response. The actual parameters returned would remain subject to any privacy rules the person had set for the requesting FORUM.

Figure 5:
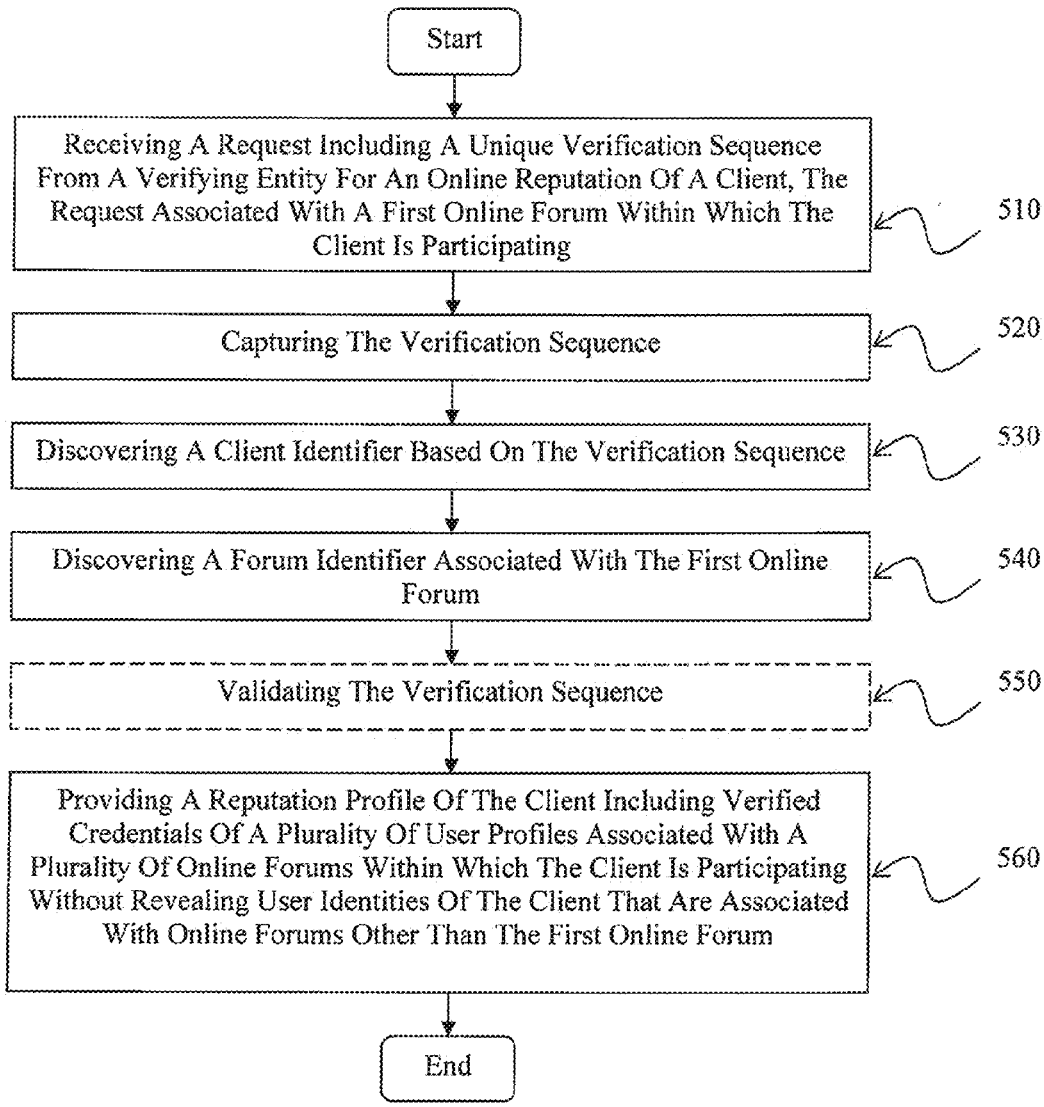
FIG. 5 is a flow diagram 500 illustrating a method for providing verification of an online reputation of a client using verification sequences, in accordance with one embodiment of the present invention.

FIG. 5 is a flow diagram 500 illustrating a method for providing verification of an online reputation of a client using verification sequences, in accordance with one embodiment of the present invention. Specifically, a corresponding verification sequence is instrumental in the presentation of the reputation profile of a client to a verifying user. The method of flow diagram 500 is implemented within the framework of data flow diagram 200, in one case. Also, flow diagram 500 can be implemented within the communication network of FIG. I, and more specifically, by the online credential service supported by SERV 160 for purposes of providing a reputation profile of the client based on the verified credentials. That is, implementation of the features illustrated in flow diagram 400 is provided by the online credential service (e.g., with domain name CredMe.com) of FIG. 1, in one embodiment.

At 510, a request is received to access an online reputation of a client. Specifically, the request is received by the credential service (e.g., CredMe.com supported by SERV 160). The request is sent from a verifying user in association with a first online forum (FORUM-1) within which the client and the verifying user are participating. The verifying user is interested in verifying the online reputation of the client (e.g., by viewing a corresponding reputation profile) in order to place a value on the communication from the client within the online forum (e.g., FORUM-1). Further, the request is sent via an invitation by the client for other users in that online forum to access the reputation profile (e.g., through the inclusion of a verification sequence in the form of a URL with a MESSAGE). The request and subsequent answer may be communicated via any suitable protocol (e.g., HTTP, wireless application protocol [WAP], domain name service [DNS], transmission control protocol [TCP], user datagram protocol [UDP], email, short message service [SMS], phone, etc.).

The request includes a unique verification sequence that is associated with the client and the first online forum, as described previously, and as such, at 520, the verification sequence is captured. Information within the verification sequence is discoverable. As described before, the verification sequence includes a user identifier (e.g., USERNAME-1) that identifies the client within the forum, a forum identifier (FORUM-1), and a verification code (CRED-1). Typically, a request is made regarding the current status of the online reputation of a client associated with any given combination of USERNAME, FORUM, and CRED information.

Specifically, at 530, an appropriate client identifier (PERS) is discovered based on the verification sequence. In particular, the verification sequence includes CRED which is based, in part, on the client identifier. Through mapping or decoding, PERS is discovered, wherein PERS is associated with the client. As such, the credential service understands that the verifying user is requesting the reputation profile of a particular client.

Also, at 540, a forum identifier that is associated with the first online forum is discovered based on the verification sequence. As described previously, the user identifier and the forum identifier is included within the request itself (e.g., within the domain name, in directory form, as data, etc.).

For instance, the verification sequence includes a corresponding verification code (e.g., CRED). Through mapping or decoding processes, information included within the verification code can be discovered. For instance, a client identifier (e.g., PERS) that is associated with the client is discoverable. In addition, the forum identifier (e.g., FORUM-1) associated with the first online forum is discoverable.

At 550, the verification sequence is optionally validated. That is, the association between the request and the client of which an online profile is requested is further verified. For instance, in the example described previously, where the verification code (CRED) includes components X and Y, validation of both X and Y is performed. Specifically, components X and Y are extracted from CRED (e.g., through decoding or mapping), and validated, as described below.

As previously described, in the present example, component X is a function of PERS and FORUM. As such, component X can be validated or verified through mapping or decoding processes. For instance, X is validated if it maps to a valid PERS and FORUM combination. Also, X is validated by decoding X into its subcomponents PERS and FORUM, which are then verified to be valid.

Also, in general, component Y is a non-invertible function of X, FORUM and USERNAME. Since the verification sequence includes in some form the forum identifier and the user identifier without further decoding (e.g., in the domain name, directory path, or data), then FORUM-1 and USERNAME-1 are known, and Y can be calculated, as long as the function is known. As such, the Y, as discovered through CRED, is verified by comparing it to the calculated Y. If the verification of X or Y fails, SERV gives a negative response.

On the other hand, if verification succeeds, SERV gives a positive response. That is, at 570, the credential service returns a reputation profile of the corresponding client to the verifying user. In the reputation profile, the user identifier with respect to the first online forum is already known to the verifying user, and may be included in the reputation profile. As described before, the request is made in association with a corresponding online forum, the first online forum, within which both the client and the requesting user are participating. As such, the verifying user typically has access to the publicly available user profile of the client that is associated with the corresponding online forum, if the verifying user chooses to visit that user profile. At the very least, the verifying user knows the user identifier (e.g., USERNAME) used by the client in association with the corresponding online forum.

Also, the reputation profile includes verified credentials from a plurality of user profiles that are associated with a plurality of online forums within which the client is participating. The reputation profile, and more specifically, the verified credentials in the reputation profile are provided without revealing user identities of the client that are associated with online forums other than the forum from which the request was made (e.g., the first online forum, FORUM-1).

For instance, the reputation profile provides at least a first verified credential of a first user profile that is associated with the first online forum (e.g., FORUM-1). In addition, the reputation profile provides, if available, at least a second verified credential of a second user profile that is associated with a second online forum (e.g., FORUM-2). More specifically, the reputation profile provides the second verified credential without revealing a user identity (e.g., user identifier or USERNAME-2) of the client that is associated with the second online forum. As such, in general, verified credentials are provided for the plurality of user profiles without revealing user identifiers of the client that are associated with online forums other than the first online forum (e.g., FORUM-1) from which the request is made.

In addition, the reputation profile may include biographical information (BIO). As described previously, BIO may be based on information generally available in association with the client identifier (PERS) used by the credential service, or may be limited to information relating to the specific forum from which the request was made (e.g., FORUM-1). In either case, BIO is restricted by the privacy rules set forth by the client.

Implementations of Reputation Profiles

FIG. 6 is a diagram of an exemplary reputation profile 600 of a corresponding client participating in one or more online forums, in accordance with one embodiment of the present invention. The reputation profile 600 describes the online reputation of a corresponding client, both with respect to the forum from which the request was generated, as well as other online forums within which the client is participating.

Block 650 includes the exemplary name of the online credential service, which is related to the domain name, CredMe.com. The credential service supports reputation profiles for a plurality of clients. In addition, block 650 includes button icons for features provided by the credential service, as follows. A "Home" button 651 allows a client to return to a home page, or main menu. The "My Profiles" button 652 allows the client to access user profiles associated with the client used for participating in online forums. The "My Account" button 653 allows the client to access the user profile of the client used to identify the client in the credential service. A "Help" button 654 provides instructions and help in using the credential service. A "Logout" button 655 logs the client out of the credential service.

Information in the reputation profile 600 can be divided into four distinct parts in blocks 610, 620, 630, and 640. The reputation profile 600 may include one or more parts, depending on the circumstances. For instance, a verifying user may not want to see all of the information in the reputation profile 600. Also, a verifying user may be communicating on a device with limited bandwidth (e.g., cell phone) and is only interested in one of the blocks.

In block 610, a public profile of the client that includes biographical information of the client is provided. The information in block 610 is parsed so as to restrict the true identity of the client and limit any connection to any user identifiers associated with the client. In this manner, the reputation profile maintains its anonymous reporting of verified credentials from multiple online forums. Typically, the information is limited to information (e.g., biographical) obtained from the user profile that is used by the client to participate in the online forum from which the request was made. For instance, the age, sex, and geographical location of the client, as reported in that user profile, is included in block 610. This information may or may not truly align with the real identify of the client. In other cases, general biographical information related to the client in association with the credential service is provided. In still other cases, the client may restrict publication of certain biographical information in the reputation profile 600.

In addition, block 611 includes an avatar image of the client that is anonymously used in connection with the credential service. As such, the client is given the option of identifying with an avatar as a label or logo. In some embodiments, the avatar can be used in place of the verification sequence, as a means for requesting the corresponding reputation profile associated with the avatar and client. The avatar in block 611 is presented in such a way to preserve the identity of the client. As such, the avatar in block 611 can correspond to the avatar associated with the user profile of the client that is used in association with the online forum from which the request was made. In that manner, the avatar in block 611 would change with requests coming from different online forums.

Also, a plurality of badges 6 I5 is presented in block 610. Each of the badges represents an award, or ranking given to the client, as set forth by the credential service. The badges provide a measure of accomplishment within the credential service. For instance, a badge may be given for participation in the credential service for a given period of time (e.g., 6 months), or indicate that the client has an online payment account, or indicate that the client has a valid cell phone number, or that the number of referrals associated with the client exceeds a threshold, etc.

Block 620 provides general information related to the user profile used by the client in the online forum from which the request was made. For instance, the forum identifier (FORUM-1) is provided, which was obtained from the verification sequence. In one implementation, the forum identifier is the name of the forum. Also, the user identifier (e.g., USERNAME) that is used by the client to participate in FORUM-1 is provided. The user identifier is obtained from the verification sequence. In addition, a link 623 to the user profile used by the client to participate in FORUM-I is provided. In this manner, the verifying user may view additional information related to the client, at least in association with FORUM-1. Also, a status for the client, in association with FORUM-1, is provided. Specifically, the verifying user can immediately check to see if credentials relating to the reputation of the client and his or her participation in FORUM-1 have been validated and for how long. In this case, the client has been verified for a period of fifteen days or more.

In block 630, verified user profiles that are associated with the client's participation in one or more online profiles are provided. As shown, a list of online forums of which the client has registered for use in establishing, managing and presenting a reputation profile is provided in column 631. For example, the client has registered at least six online forums, to include the CredMe.com forum, FORUM-1, FORUM-2, FORUM-3, FORUM-4, and FORUM-5. The list may be increased or decreased depending on the number of online forums have been registered, and in some cases, the number that have been verified.

A status of the verification of user profiles and credentials for each forum is provided in column 632. For instance, an online forum may be given a valid, invalid, or lapsed status. A valid status indicates that the corresponding user profile has been verified within an acceptable period. The invalid status indicates that the corresponding user profile may not exist, or has not been verified within the acceptable period. In addition, an online forum with an invalid status may also be dropped from block 630. A lapsed status indicates that the user profile and corresponding credential for a corresponding forum has not been verified for a given period that is less than the period used to invalidate a forum, and is in a probationary period. In one embodiment, forums with a lapsed or invalid status that are subsequently validated suffer no harm, in that there is no lasting indication that the corresponding forum had been associated with invalid or lapsed status.

In addition, the number of days that the forum has been verified over a period extending from the first date of verification to the current date is provided in column 633. The online forums may be organized in terms of longevity. For instance, forums with longer periods of verification will be listed over forums with lesser periods of verification. As a representative example, FORUM-1 has a valid status, and has been verified for at least fifteen days. Also, FORUM-3 is associated with an invalid status. The number of days of verification may or not be listed for forums with an invalid status. For instance, the days of verification for FORUM-3 is not listed. Days of verification information for forums with lapsed status may still be listed.

At block 640, verified credentials of corresponding forums are provided. In this manner, an overall representation of the online reputation of the client is presented. A verifying user may look at the information presented in block 640 to gain a sense of how much trust can be placed with the user bd808 in FORUM-1. The list of verified credentials may increase or decrease depending on the number of available credentials, as will be described below.

For instance, a list of online forums is provided in column 641. The list of online forums in column 641 may or may not align with the list of forums in column 631, since presentation of verified credentials may be restricted by the client, or may be deleted if the corresponding forum has an invalid or lapsed status.

Credentials that have been verified are presented in column 642. In addition, a value for a corresponding verified credential is presented in column 643. For instance, a verified credential for the CredMe forum is the number of online forums that have been registered, which in this case is at least five. As another example, two verified credentials are provided for FORUM-5, which is representative of an auction forum, in which users may participate in an online auction for goods and services. The first verified credential is the number of sales presented, which totals over fifty for the client's participation in FORUM-5. This number may indicate that the client is a heavy participant in FORUM-5. Also, an A-rating credential that is associated with the client is also provided, and indicates that no complaints have been lodged against client in those fifty sales.

As shown in block 640, verified credentials for FORUM-1 and FORUM-2 are not provided, even though the status of those forums are valid. In these cases, the client has chosen not to list the credentials that have been verified for those forums. For instance, in an online chess forum, the credential service checks the rating of the client. The client may choose to restrict publication of the rating because he or she is just beginning to play chess, and is associated with a low rating. The client may be restricting publication of the rating in order to attract higher level players to speed up the learning process. Verified credentials for FORUM-3, FORUM-4, and FORUM-5 are not presented because corresponding user profiles have an invalid status.

Restriction of various credentials may be imposed by the client upon registering a corresponding online forum. For instance, upon registration, the credential service may indicate what credential or credentials will be used in the reputation profile. The credential service may provide, at that time, the option to restrict publication of any or all credentials relating to that online forum. In addition, the client, may at a later time opt to change the restriction or non-restriction of any or all credentials relating to that online forum. In this manner, the client is given control over what information is published in the reputation profile.

Although the reputation profile 600 includes various information used for giving a verifying user an overall impression of an online reputation of the client, as identified through the corresponding forum, other embodiments of the invention are well suited to other formats for the reputation profile, as well as providing different information. For instance, in the case of a verifying user making requests over a cell phone, the reputation profile may come back with a text string, or text message. In one implementation, the text string may be a YES or NO, where a YES indicates that the client has a good reputation, and a NO indicates that the client has a bad reputation.

FIG. 7 is a diagram of another exemplary reputation profile 700, in accordance with another embodiment of the present invention. The reputation profile 700 includes information relating to the online reputation of a particular client that is provided and supported by the credential service (e.g., SERV 160). Block 710 includes the exemplary name of the online verification service, which in this case is related to the domain name "CredMe.com." The information in reputation profile 700 is presented in a different format from the reputation profile 600, and may include more information.

As shown in FIG. 7, block 790 includes space reserved for advertising, in one embodiment. Advertising space may be included in any format of the reputation profile, such as in FIG. 6.

As shown in FIG. 7, the client is participating in various online forums to include the following: FORUM-1.com; FORUM-2.com; FORUM-3.com; FORUM-4.com, which supports an online encyclopedia; and FORUM-N.com, which supports a video sharing forum. Verification of the client's online reputation can be accessed through one or more of the online forums within which the client is participating. For purposes of discussion, as shown in FIG. 7, the client is participating in FORUM-1.com (e.g., entering messages into a discussion thread). In addition, a request for verification of the online reputation associated with the client is sent in association with the client's participation within FORUM-1.com. That is, in relation to the client's participation in FORUM-1.com, a verifying user, also participating in FORUM-1.com, would like to verify the online reputation of the client, by accessing the reputation profile 700 associated with the client (e.g., through a URL of a verification sequence). As previously described, reputation profile 700 is formatted according to the online forum from which the request for verification of the online reputation of the client was sent. As such, since the request is associated with the client's participation of FORUM-1.com, the reputation profile 700 is formatted according to FORUM-1.com.

In particular, block 720 provides information relating to the client with respect to FORUM-1.com, from which the request for verification originated. Specifically, the user profile associated with the client as represented in FORUM-1.com is verified through the credential service, as previously described in relation to FIGS. 2, 4 and 5. As shown in block 720, the forum specific user identifier associated with the client and his or her participation in FORUM-1.com is "jSmith."

Information, such as verified credentials, relating to the online reputation of the client is provided in block 725. Block 725 provides information relating to the reputation of the client in association with FORUM-1.com, and more particularly, provides information relating to the relationship the client has with FORUM-1.com. In one embodiment, the information provided in block 725 is parsed from the user profile associated with the client that is obtained from FORUM-1.com. For instance, as shown in block 725, user identifier, jSmith, that is associated with the client, has 99 connections, and has listed various interests including hunting and fishing. In addition, the information listed in block 725 also indicates that jSmith won Father of the Year in 2003. Additional information may also be included.

The information included in block 725 is intended to give a sense of the credibility, or online presence, of the client. For instance, the information may indicate the longevity of the client in his or her professional career as well as the reputation of the client within a particular field (e.g., author of ten patents). In addition, the information may give a sense of how long the client has been participating within the online forum, FORUM-1.com. For instance, the fact that the client has 99 connections may indicate that the client has been participating within FORUM-1.com for an extended period of time. As such, the discussion provided by the client in FORUM-1.com may be given more weight, given the experience of the client, as well as the longevity of the client.

As described previously, in one embodiment, the client is able to limit the amount of information provided in reputation profile 700. For instance, the client may determine that the information provided in reputation profile 700 is too personal. A request from the client may be entered to remove some information in block 725.

In addition, reputation profile 700 includes additional reputation information for other online forums (e.g., FORUM-2.com; FORUM-3.com; FORUM-4.com; on up to FORUM-N.com), in block 730. That is, the user profiles associated with the client as represented in these other online forums listed above are verified through the credential service. Taken as a whole, piecing together the information relating to the online reputations of the client with respect to each online forum with which the client participates gives a sense of the overall online reputation of the client.

Of significance, the reputation information related to other online forums is provided anonymously. That is, identifying information relating to the client's participation in the other online forums is not provided. For instance, the user name, johns44, as used by the client in FORUM-2.com is not displayed, and the user name, scuba8, as used by the client in FORUM-3.com is not displayed. In other embodiments, no biographical information is displayed. Specifically, the only reference to the client found in reputation profile 700 is the user identifier (e.g., jSmith) specific to FORUM-1.com from which the request for online verification was generated. That is, no usernames associated with the other online forums (e.g., FORUM-2.com; FORUM-3.com; FORUM-4.com on up to FORUM-N.com) is used or identified. However, most importantly, the online reputation of the client with respect to those other online forums is provided.

For instance, information relating to the online reputation of the client in association with the client's participation in online forum, FORUM-2.com, is provided in block 732. FORUM-2.com may be an online forum that provides a dating service. In particular, block 732 provides information collected from the user profile associated with FORUM-2.com and pertains to the relationship the client has with FORUM-2.com. For instance, in block 725, the client has 9 friends and is currently thinking "why he is not in Alaska fishing." In addition, block 725 includes other personal information, such as relationship status, hometown, religion, zodiac sign, education, etc. Additional information may also be included. Also, the client may choose to restrict publication of certain information, as previously described. This information is provided in order to support the online reputation of the client, especially with respect to the relationship the client has with online forum, FORUM-2.com.

Further information relating to the online reputation of the client in association with the client's participation in online forum, FORUM-3.com, is also provided in block 733. Again, identifying information for the client in relation to FORUM-3.com (e.g., user identifier for FORUM-3.com) is not provided. FORUM-3.com may be an online social networking service that links individuals together on a social basis, or a professional basis. The information provided in block 733 is automatically collected from the user profile associated with FORUM-3.com and pertains to the relationship the client has with FORUM-3.com. For instance, in block 732, the client has 200+ friends. Additional information may also be included. As described previously, the information is provided in order to support the online reputation of the client, specifically with respect to the relationship the client has with online forum, FORUM-3.com.

Similar information relating to the online reputation of the client in association with FORUM-4.com is provided in block 734. FORUM-4.com is an online forum providing an online encyclopedia service. Again, identifying information is not provided for the client in relation to FORUM-4.com. However, information pertaining to the online reputation of the client with respect to FORUM-4.com is provided, such as the fact that the client has made 74 edits to the online encyclopedia. Additional information may also be provided.

Additionally, information relating to the online reputation of the client in association with the client's participation in an online forum, FORUM-N.com, is also provided in block 739. Importantly, the information is provided anonymously. FORUM-N.com may be a video sharing service. The information provided in block 739 is automatically collected form the user profile associated with FORUM-N.com and pertains to the relationship the client has with FORUM-N.com. For instance, in block 739, information shows that the client joined FORUM-N.com in July 2006, and the last login was 3 months ago. In addition, the client is from the United States, and has watched approximately 394 videos. Additional information may be included. As described previously, the information in block 739 is provided to support the online reputation of the client, especially with respect to the relationship the client has with FORUM-N.com.

Reputation profile 700 provides an overall online reputation of the client to the interested user. The interested user is able to view the online participation of the client, which is known to the interested user as jSmith, the username of the client on FORUM-1.com. As such, the interested party is able to verify the online reputation of the client, since the reputation profile 700 is associated with username j Smith, and URL 750 indicates that the reputation profile 700 is associated with FORUM-1.com and j Smith, the client. Specifically, the interested user is able to view the online reputation of the j Smith in relation to each of the online forums that is reported for a client that is associated with username, j Smith, in reputation profile 700, without viewing any identifying information of the client with respect to other online forums.

As a result, the information provided in reputation profile 700 provides an overall sense of the online reputation of the client, known to the verifying user as j Smith. For instance, the overall online reputation of the client probably gives the verifying user some comfort. Specifically, information relating to the online reputation indicates that the client known as j Smith is a frequent participant in various forums, that the client has participated in these forums for an extended period of time, and that the client has formed numerous contacts within these forums. Because of the information provided in the reputation profile 700 relating to the online reputation of the client, the interested party is more likely to trust the communication from jSmith, the client, in FORUM-1.com.

On the other hand, if the information included in reputation profile 700 did not include relationships to more than one online forum, and indicated that the history of the client with FORUM-1.com and other related online forums was recently formed, then the interested party could come to the conclusion that j Smith does not have a good online reputation, or at least an online reputation that is inexperienced. In that case, the interested party may be wary of the communication presented by j Smith on FORUM-1.com.

For instance, the information on the reputation profile 700 may not include relationships with numerous online forums because those online forums have kicked off the client for bad behavior, and subsequently removed the corresponding user profile from those online forums. In that case, through updating, the reputation manager 166 of FIG. 1 is able to delete the information relating to those online forums from which the client was kicked off As such, the reputation profile 700 would not include a verification of the online reputation for the client with respect to those online forums in which the client was kicked off As such, a passive degradation of the client's online reputation is achieved, since over time, as more and more online forums kick off the client from participating in the forum, the online reputation of the client as reflected in reputation profile 700 would show that, as no verified profiles would be present for those online forums. That is, the online reputation of the client would gradually degrade with each removal of a previously verified online reputation.

FIG. 8 is an illustration of an exemplary discussion thread in which a client is inviting other participants of the forum to view the online reputation of the client, in accordance with one embodiment of the present invention. As shown in block 810 of FIG. 8 the online forum is associated with Forum1.com, which provides a forum within which to discuss various topics. For instance, as shown in block 820, the discussion topic of interest is related to building gazebos.

As should be clear from the above description relating to FIGS. 1-7, the invention is well suited to the presentation of anonymous digital credentials CRED in cases other than posting messages to a forum website or file sharing access point for FORUM. Embodiments of the present invention are well suited to presenting credentials in any network communication. Further, the credentials CRED need not necessarily be tied to a particular forum, where a message is being posted. For example, the credentials CRED could be tied to the credential server SERV.

A discussion thread is highlighted in block 830. That is, below block 830 and line 835, a discussion thread is displayed for the discussion topic. The discussion thread includes messages that are entered by various users, to include username, jSmith, in block 840 and USERNAME-N in block 850.

In particular, the message provided in block 840 is entered by jSmith, and includes the following text: "I have built a gazebo using a pretty good set of plans . . . " In addition, the message includes a signature of jSmith 841. Also, jSmith has included a URL 845, that includes a corresponding verification sequence, that invites all users of Forum I .com to verify the online reputation of the client, jSmith. As shown in FIG. 8, URL 845 is related to the verification sequence (e.g., link) previously described, and is provided below:

http://CredMe.com/verify/Forum1.com/jSmith/2094594

In particular, for those users who are interested in verifying the online reputation of jSmith, as known to users of Forum1.com, all they need to do is click on, activate, or access the URL 845. Upon activation of URL 845, the interested party is brought to the reputation profile 700 that is associated with the client, jSmith.

As shown in FIG. 8, URL 845 includes the verification code, "2094594." However, in other embodiments of the present invention, the URL 845 may not necessarily include the verification code, and still is able to connect to reputation profile 700. For instance, URL 845 without verification code is shown, as follows:

http://CredMe.com/verify/Forum1.com/jSmith/

In addition, as shown in FIG. 8, a message is provided by another user, usernameN. The assertion, that a gazebo can be built in less than an hour, provided by this user is rather bold. Also, no URL is provided for verification of the online reputation of usernameN. As such, any user who is reading the message in block 850 would treat it with suspicion, especially since no online verification is provided. To address these possibly inflammatory and unsubstantiated messages, in one embodiment, an online forum may require that all users who participate also enlist in the online verification service illustrated in the present invention.

In another embodiment, the host or forum provider of an online forum is able to utilize the online reputation of clients to its advantage. Specifically, the forum provider is able to use the verification sequence, that includes the verification code that is associated with a particular client, to manage participation of the client in the corresponding online forum. For instance, in the case where a particular client is behaving badly on an online forum and is subsequently removed, the forum provider is able keep that client from coming back under an assumed and different username.

In particular, the forum provider may require that all participants be associated with an online reputation, as those in embodiments of the present invention. Additionally, online reputations may be preferred by the users of the corresponding online forum for trust purposes. In either case, the forum provider is able to utilize the verification link to manage participation of a client that has been kicked off the forum. For example, the client previously participated in the online forum as USERNAME1. Because of bad behavior by USERNAME1, the forum provider kicked off USERNAME1 by removing the corresponding registered user profile associated with USERNAME1. As such, participation in the online forum1 by USERNAME1 is also prohibited and prevented.

As previously described, the client may attempt to re-register to the online forum using another, alias username, such as USERNAME2. Because the forum provider requires access to an online reputation, or because the users of the online forum rely on using the online reputations to determine trustworthiness of other users, the client also must provide access to an associated online reputation as provided by an online verification service (e.g., CredMe.com). If the client, now posing as USERNAME2, uses the same online reputation previously associated with USERNAME1, the forum provider would be able to discover this and again prevent participation in the online forum by the client, now posing as USERNAME2. Specifically, because the client is trying to use the same online reputation, the verification sequence, and more particularly, the verification code that is associated with the client identifier and site identifier would be the same. That is, whether registering as USERNAME1 or USERNAME2, the underlying verification code would be identical, since the client identifier is the same, the forum identifier is the same, and the combination of the client and forum identifiers would be the same.

As such, if the client registering now as USERNAME2 attempts to use the same online reputation previously used in association with USERNAME1, the forum provider would recognize that the verification code in association with USERNAME2 would be the same verification code used in association with USERNAME 1. Thus, the forum provider would recognize that USERNAME1 and USERNAME2 are associated with the same client, who the forum provider has previously banned from participating in the online forum. As a result, the forum provider can also deny registration of USERNAME2, or upon discovery, remove USERNAME2 from participating in the corresponding online forum.

In the above case, retaining the same online reputation is desirable. A reputable online reputation is difficult to build since it depends on the online history of the client with various online forums. As such, it takes time and energy to build up a reputable online reputation. Should the client decide to avoid the above situation, the client could register as USERNAME2 using a totally new and different online reputation or personality. However, the new online reputation probably would not hold as much weight, since there may not be many entries of verified online reputations with other online forums, and the history of those relationships would be pretty sparse, since it takes valuable time and energy to build up this alternate online reputation. As a result, the users of the online forum may not put any credence on the comments made by USERNAME2, since its associated online reputation is not of any worth.

As a result, the use of the online reputation, and the verification of the online reputation provides motivation for online users to be better online citizens. The use of online reputations and the management of the online reputation is a valuable tool in promoting the beneficial participation of users in online forums. Online reputations can be checked to determine the trustworthiness of a particular user of a corresponding forum. In addition, users with online reputations would be motivated to behave with proper online etiquette to preserve the integrity of his or her associated online reputation.

Example Implementation of Anonymous Digital Credentials

Here follows is an exemplary scenario in which anonymous digital credentials are used to create an online reputation within the context of one or more online forum within which a client is participating. In this example, the forum is the social forum "jamtothis." This social forum allows a client to post a message (forming part of or even initiating a so-called "thread" of messages) and affix next to the message a user identifier (e.g., USERNAME), a verification sequence, and optionally, an avatar. In embodiments of the present invention, the client can choose to display either anonymous digital credentials or the avatar for purposes of creating, managing, and presenting a reputation profile of the client.

In the jamtothis (social) forum, as in other forums, information about the user is included in a so-called public profile. The public profile can be accessed, such as through a hyperlink located next to the USERNAME. At jamtothis, such information includes forum-related information (such as the user's join date), contact information, and additional data (such as date of birth, profession, and other biographical information). The public profile information is generated by the forum software, i.e. by the software that powers jamtothis, such as the popular vBulletin instant community software.

One feature of this forum software is the ability to accept plug-in modules to modify and extend the functionality for a website ordinarily provided by vBulletin. As such, a module could be added to the software that powers jamtothis (e.g., software run by vBulletin), so as to display a client's anonymous digital credentials and biographical information as part of the default forum software. Further, software could be provided to jamtothis or vBulletin so that in the course of a new user registering with jamtothis or any other forum powered by vBulletin, the user would be invited to establish an account with the credential server SERV.

Embodiments of the present invention prevent a user in jamtothis from being kicked out and returning by simply inventing a new user identifier (and possibly a new avatar), and provide the same or different public profile. Specifically, the user offers verifiable credentials (and biographical information) that is related to a real identity (e.g., the client), an identity that does not change for jamtothis. As noted above, the client is required to provide to the credential server some tag information (e.g., cell phone) that ties the client to an account held by the client, as identified by the client identifier (PERS). Thus, if the client attempts to create new anonymous digital credentials for jamtothis, but still tries to leverage the reputation associated with PERS, the credential server can determine whether the tag information provided by a new client is already on file, and whether it is already linked to a client identifier used for accessing the forum website or file sharing access point. In that case, the new client is really just attempting to create a new persona (username, etc.) for the forum. In at least some embodiments, SERV refuses to issue (new) anonymous digital credentials. Thus, the invention provides an obstacle making it more difficult and so less likely that a user will create a new persona to regain access to a social forum.

In other embodiments, the forum itself could regulate user behavior especially when a user asks for new credentials (e.g., registers with the same FORUM but with a different user identifier, USERNAME-2), but still tries to leverage the reputation of the client. The client would still provide the same tag information TAG in generating CRED, and as such, SERV will produce the same anonymous digital credentials (CRED), despite the different USERNAME-2. As such, if FORUM keeps track of anonymous digital credentials CRED and links them to user identifiers, the FORUM can determine for itself whether USERNAME-2 is actually a previous user (USERNAME-1). In that way, if USERNAME-1 has been removed from FORUM, then USERNAME-2 can also be prevented from participating in FORUM.

Following along these lines, in still another embodiment, SERV can provide an indication of how many different usernames a user has registered with SERV for a particular forum. This can be implemented in a graphic providing the anonymous digital credentials or as part of the biographical information provided for any of the different usernames. In such embodiments, the other users actually tend to regulate behavior in the use and access of the forum, by choosing whether to ignore any posting, sharing of messages, or files by the user.

Accordingly, embodiments of the present invention are capable of verifying credentials of multiple online accounts of a particular client. In this manner, an online reputation of the client is established and managed for purposes of online verification of the client's reputation. Still other embodiments of the present invention are capable of providing the above accomplishments and also for providing reputation management for users and operators of online communities.

While the methods of embodiments illustrated in flow charts 4 and 5 show specific sequences and quantity of operations, the present invention is suitable to alternative embodiments. For example, not all the operations provided for in the methods presented above are required for the present invention. Furthermore, additional operations can be added to the operations presented in the present embodiments. Likewise the sequences of operations can be modified depending upon the application.

A method and system for establishing an online reputation of a client participating in one or more online forums and providing verification of the online reputation of the client is thus described. While the invention has been illustrated and described by means of specific embodiments, it is to be understood that numerous changes and modifications may be made therein without departing from the spirit and scope of the invention as defined in the appended claims and equivalents thereof. Furthermore, while the present invention has been described in particular embodiments, it should be appreciated that the present invention should not be construed as limited by such embodiments, but rather construed according to the below claims.

What is claimed is:

1. A computer-implemented method for providing reputation profiles, comprising:
    receiving, by an online credential service, a registration request for establishing a reputation profile from a client participating in a first forum of a plurality of online forums;
    generating, by the online credential service, a unique verification code associated with the first forum;
    assigning, by the online credential service, a unique client identifier to the client, wherein the unique client identifier uniquely identifies the client within the online credential service and the unique client identifier is not revealed to the client and to the public;
    creating, by the online credential service, a reputation profile for the client associated with the first forum based on the unique client identifier and the unique verification code associated with the first forum and;
    responsive to detecting that the client is removed from the first forum:
        removing, by the online credential service, a verification of the reputation profile of the client from a corresponding reputation profile for the client associated with the first forum; and
        updating, by the online credential service, the reputation profile of the client to delete the verification of the reputation profile relating to the first forum, wherein removal of the verification of the reputation profile of the client from the corresponding reputation profile indicates a degradation of the reputation of the client within the online credential service.

2. The method of claim 1, further comprising:
    generating a unique verification code for each other online forum of the plurality of the online forums participated by the client; and
    transmitting the unique verification code associated with each forum of the plurality of online forums to the client.

3. The method of claim 2, wherein the unique verification code associated with a forum of the plurality of the online forums is transmitted as an anonymous digital credential to be included in a user profile associated with the forum.

4. The method of claim 2, wherein the unique verification code associated with each forum identifies the client using different user names within each forum of the plurality of online forums.

5. The method of claim 1, wherein a unique forum identifier is associated with each forum of the plurality of online forums.

6. The method of claim 1, further comprising:
    determining whether a corresponding unique verification code is included in a user profile associated with a first forum; and
    responsive to a determination that the corresponding unique verification code is included the user profile associated with the first forum, updating the reputation profile of the client indicating that the user profile associated with the first forum is verified.

7. The method of claim 1, further comprising:
    receiving a request from the client to verify a user profile associated with a second forum of the plurality of online forums; and
    updating the client reputation profile upon verification of the user profile associated with the second forum.

8. The method of claim 7, wherein updating the client reputation profile comprises:
    determining whether a second corresponding verification code is included in the user profile associated with the second forum; and
    responsive to a determination that the second corresponding verification code is included in the user profile, updating the reputation profile of the client indicating that the user profile associated with the second forum is verified, wherein the updated reputation profile provides a second verified credential without revealing an identity of the client associated with the second forum.

9. The method of claim 1, further comprising:
    receiving a query on the reputation profile of the client participating in a forum of the plurality of online forums, the query including a verification sequence associated with the forum;
    determining a client identifier and a forum identifier from the verification sequence; and
    presenting a list of verification status of the user profiles associated with one or more forums based on the determined client identifier and the forum identifier.

10. A non-transitory computer-readable storage medium storing executable computer program instructions for providing reputation profiles, the computer program instructions comprising instructions for:
    receiving, by an online credential service, a registration request for establishing a reputation profile from a user participating in a first forum of a plurality of online forums;
    generating, by the online credential service, a unique verification code associated with the first forum;
    assigning, by the online credential service, a unique client identifier to the client, wherein the unique client identifier uniquely identifies the client within the online credential service and the unique client identifier is not revealed to the client and to the public;
    creating, by the online credential service, a reputation profile for the client associated with the first forum based on the unique client identifier and the unique verification code associated with the first forum and;
    responsive to detecting that the client is removed from the first forum:
        removing, by the online credential service, a verification of the reputation profile of the client from a corresponding reputation profile for the client associated with the first forum; and updating, by the online credential service, the reputation profile of the client to delete the verification of the reputation profile relating to the first forum, wherein removal of the verification of the reputation profile of the client from the corresponding reputation profile indicates a degradation of the reputation of the client within the online credential service.

11. The computer-readable storage medium of claim 10, further comprising computer program instructions for:

generating a unique verification code for each other online forum of the plurality of the online forums participated by the client; and transmitting the unique verification code associated with each forum of the plurality of online forums to the client.

12. The computer-readable storage medium of claim 11, wherein the unique verification code associated with a forum of the plurality of the online forums is transmitted as an anonymous digital credential to be included in a user profile associated with the forum.

13. The computer-readable storage medium of claim 11, wherein the unique verification code associated with each forum identifies the client using different user names within each forum of the plurality of online forums.

14. The computer-readable storage medium of claim 10, wherein a unique forum identifier is associated with each forum of the plurality of online forums.

15. The computer-readable storage medium of claim 10, further comprising computer program instructions for:

determining whether a corresponding unique verification code is included in a user profile associated with a first forum; and responsive to a determination that the corresponding unique verification code is included the user profile associated with the first forum, updating the reputation profile of the client indicating that the user profile associated with the first forum is verified.

16. The computer-readable storage medium of claim 10, further comprising computer program instructions for:

receiving a request from the client to verify a user profile associated with a second forum of the plurality of online forums; and updating the client reputation profile upon verification of the user profile associated with the second forum.

17. The computer-readable storage medium of claim 16, wherein updating the user reputation profile comprises:

determining whether a second corresponding verification code is included in the user profile associated with the second forum; and responsive to a determination that the second corresponding verification code is included in the user profile, updating the reputation profile of the client indicating that the user profile associated with the second forum is verified, wherein the updated reputation profile provides a second verified credential without revealing an identity of the client associated with the second forum.

18. The computer-readable storage medium of claim 10, further comprising computer program instructions for:

receiving a query on the reputation profile of the client participating in a forum of the plurality of online forums, the query including a verification sequence associated with the forum;

determining a client identifier and a forum identifier from the verification sequence; and presenting a list of verification status of the user profiles associated with one or more forums based on the determined client identifier and the forum identifier.

* * * * *

UNITED STATES PATENT AND TRADEMARK OFFICE
CERTIFICATE OF CORRECTION

PATENT NO. : 9,712,497 B2
APPLICATION NO. : 14/863581
DATED : July 18, 2017
INVENTOR(S) : Timothy P. Barber and Lewis De Payne It is certified that error appears in the above-identified patent and that said Letters Patent is hereby corrected as shown below:

Claim 6, Line 13: replace "unique verification code is included the user profile" with -- unique verification code is included in the user profile --.
Claim 15, Line 36: replace "unique verification code is included the user profile" with -- unique verification code is included in the user profile --.

Signed and Sealed this
Twenty-fourth Day of April, 2018

Andrei Iancu
*Director of the United States Patent and Trademark Office*